US009885812B2

(12) United States Patent
Malkan

(10) Patent No.: US 9,885,812 B2
(45) Date of Patent: Feb. 6, 2018

(54) FEATURE FOR INHIBITING LIGHT STRIPE BETWEEN CELLULAR ELEMENTS IN A COVERING FOR AN ARCHITECTURAL OPENING

(75) Inventor: Sanjiv R. Malkan, Broomfield, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 702 days.

(21) Appl. No.: 14/240,290

(22) PCT Filed: Aug. 27, 2012

(86) PCT No.: PCT/US2012/052473
§ 371 (c)(1),
(2), (4) Date: Feb. 21, 2014

(87) PCT Pub. No.: WO2013/032997
PCT Pub. Date: Mar. 7, 2013

(65) Prior Publication Data
US 2014/0168779 A1    Jun. 19, 2014

Related U.S. Application Data

(60) Provisional application No. 61/528,028, filed on Aug. 26, 2011.

(51) Int. Cl.
G02B 5/22      (2006.01)
E06B 9/262    (2006.01)
E06B 9/386    (2006.01)

(52) U.S. Cl.
CPC .............. *G02B 5/22* (2013.01); *E06B 9/262* (2013.01); *E06B 9/386* (2013.01); *E06B 2009/2627* (2013.01)

(58) Field of Classification Search
USPC ....... 160/32–36, 166.1–178.3; 359/577–590, 359/591–598, 599, 601, 609, 613–614
See application file for complete search history.

(56) References Cited

U.S. PATENT DOCUMENTS 2,118,134 A    5/1938   Allison
2,201,356 A    5/1940   Terrell
(Continued)

FOREIGN PATENT DOCUMENTS

AU    622268 B2    9/1991
AU    2004308391 B2    7/2005
(Continued)

OTHER PUBLICATIONS

PCT International Search Report and Written Opinion dated Oct. 26, 2012, PCT Application No. PCT/US2012/052473, 20 pages.
(Continued)

*Primary Examiner* — Bumsuk Won
*Assistant Examiner* — Jeffrey Madonna
(74) *Attorney, Agent, or Firm* — Dority & Manning, P.A.

(57) ABSTRACT

A covering for an architectural opening. The covering includes a cellular panel having at least two cellular units or rows. The covering also includes a light absorbing element positioned at an interface between the at least two cellular units. The light absorbing element may absorb substantial all visible light wavelengths.

23 Claims, 17 Drawing Sheets

(56) References Cited

U.S. PATENT DOCUMENTS

| | | | |
|---|---|---|---|
| 2,264,140 A * | 11/1941 | Mulberg | A47H 23/10 |
| | | | 106/169.45 |
| RE22,311 E | 5/1943 | Roy | |
| 2,318,525 A | 5/1943 | Renton | |
| 3,370,972 A | 2/1968 | Nagel et al. | |
| 3,386,490 A | 6/1968 | Kandel | |
| 3,487,875 A | 1/1970 | Shukat et al. | |
| 3,490,515 A | 1/1970 | Kandel | |
| 4,019,554 A | 4/1977 | Rasmussen | |
| RE29,340 E | 8/1977 | Matsunami et al. | |
| 4,069,857 A | 1/1978 | Brookshire | |
| 4,397,346 A | 8/1983 | Chumbley et al. | |
| D277,061 S | 1/1985 | Picoy | |
| 4,542,602 A | 9/1985 | Hoverson | |
| 4,647,488 A | 3/1987 | Schnebly et al. | |
| 4,675,060 A | 6/1987 | Schnebly et al. | |
| 4,676,855 A | 6/1987 | Anderson | |
| 4,677,012 A | 6/1987 | Anderson | |
| 4,677,013 A | 6/1987 | Anderson | |
| 4,698,276 A | 10/1987 | Duval | |
| 4,739,816 A | 4/1988 | Dodich et al. | |
| 4,751,115 A | 6/1988 | Smith et al. | |
| 4,846,243 A | 7/1989 | Schneider | |
| 4,884,612 A | 12/1989 | Schnebly et al. | |
| 4,915,153 A | 4/1990 | Toti | |
| 4,921,032 A | 5/1990 | May | |
| 4,943,454 A | 7/1990 | Neff | |
| 4,974,656 A | 12/1990 | Judkins | |
| 4,984,617 A | 1/1991 | Corey | |
| 4,999,073 A | 3/1991 | Kao et al. | |
| 5,037,700 A | 8/1991 | Davis | |
| 5,043,039 A | 8/1991 | Swiszcz | |
| 5,090,098 A | 2/1992 | Seveik et al. | |
| 5,129,440 A | 7/1992 | Colson | |
| 5,158,632 A | 10/1992 | Colson | |
| 5,160,563 A | 11/1992 | Kutchmarek et al. | |
| 5,193,601 A | 3/1993 | Corey et al. | |
| 5,205,333 A | 4/1993 | Judkins | |
| 5,207,257 A | 5/1993 | Rupel et al. | |
| 5,296,974 A | 3/1994 | Tada et al. | |
| 5,313,998 A | 5/1994 | Colson et al. | |
| 5,390,720 A | 2/1995 | Colson et al. | |
| 5,409,050 A | 4/1995 | Hong | |
| 5,425,408 A | 6/1995 | Colson | |
| 5,455,098 A | 10/1995 | Cheng | |
| 5,482,750 A | 1/1996 | Colson et al. | |
| 5,485,875 A | 1/1996 | Genova | |
| 5,490,533 A | 2/1996 | Carter | |
| 5,503,210 A | 4/1996 | Colson et al. | |
| 5,547,006 A | 8/1996 | Auger | |
| 5,560,976 A | 10/1996 | Huang | |
| 5,566,735 A | 10/1996 | Jelic | |
| 5,620,035 A | 4/1997 | Judkins | |
| 5,632,316 A | 5/1997 | Cohen | |
| 5,649,583 A | 7/1997 | Hsu | |
| 5,654,073 A | 8/1997 | Swiszcz et al. | |
| 5,690,156 A | 11/1997 | Ruggles | |
| 5,706,876 A | 1/1998 | Lysyj | |
| 5,746,266 A | 5/1998 | Colson et al. | |
| 5,787,951 A | 8/1998 | Tonomura et al. | |
| 5,791,390 A | 8/1998 | Watanabe | |
| 5,813,447 A | 9/1998 | Lysyj | |
| 5,837,084 A | 11/1998 | Barss | |
| 5,974,763 A | 11/1999 | Colson et al. | |
| 6,006,812 A | 12/1999 | Corey | |
| 6,033,504 A | 3/2000 | Judkins | |
| 6,052,966 A | 4/2000 | Colson et al. | |
| 6,103,336 A | 8/2000 | Swiszcz | |
| D436,783 S | 1/2001 | Cooper et al. | |
| 6,257,300 B1 | 7/2001 | Brownlie | |
| D448,594 S | 10/2001 | Throne | |
| 6,302,181 B1 | 10/2001 | Rupel | |
| 6,319,586 B1 * | 11/2001 | Colson | B29D 99/0089 |
| | | | 160/84.05 |
| 6,345,486 B1 | 2/2002 | Colson et al. | |
| 6,354,353 B1 | 3/2002 | Green et al. | |
| 6,416,842 B1 * | 7/2002 | Swiszcz | B31D 3/0215 |
| | | | 428/116 |
| 6,461,464 B1 | 10/2002 | Swiszcz | |
| 6,497,264 B1 | 12/2002 | Paskevicius | |
| 6,497,266 B1 * | 12/2002 | Palmer | E06B 9/386 |
| | | | 156/308.2 |
| 6,520,238 B2 | 2/2003 | Allsopp | |
| 6,550,519 B2 | 4/2003 | Green et al. | |
| 6,572,725 B2 | 6/2003 | Goodhue | |
| 6,601,637 B2 | 8/2003 | Toti | |
| 6,662,845 B1 | 12/2003 | Palmer | |
| 6,675,859 B2 | 1/2004 | Nien | |
| 6,740,389 B2 | 5/2004 | Yu | |
| 6,767,615 B1 | 7/2004 | Judkins et al. | |
| 6,792,996 B1 | 9/2004 | Yu et al. | |
| D498,105 S | 11/2004 | Tyner | |
| 6,834,702 B2 | 12/2004 | Nien | |
| D501,749 S | 2/2005 | Gruner | |
| 6,932,138 B2 | 8/2005 | Yu et al. | |
| 6,988,526 B2 | 1/2006 | Judkins | |
| 6,989,066 B2 * | 1/2006 | Yu | B31D 3/002 |
| | | | 156/182 |
| D514,859 S | 2/2006 | Herhold | |
| 7,021,359 B2 | 4/2006 | Yu et al. | |
| 7,117,919 B2 | 10/2006 | Judkins | |
| 7,124,802 B2 | 10/2006 | Sudano | |
| 7,131,479 B1 | 11/2006 | Marusak et al. | |
| 7,143,802 B2 | 12/2006 | Strand et al. | |
| 7,159,634 B1 | 1/2007 | Judkins | |
| 7,191,816 B2 | 3/2007 | Colson et al. | |
| 7,275,580 B2 | 10/2007 | Yu et al. | |
| 7,290,582 B2 | 11/2007 | Lin | |
| 7,353,856 B2 | 4/2008 | Pon et al. | |
| D568,082 S | 5/2008 | Bohlen | |
| 7,404,428 B2 * | 7/2008 | Sun | E06B 9/262 |
| | | | 156/197 |
| 7,415,845 B1 | 8/2008 | Graichen | |
| 7,513,292 B2 | 4/2009 | Auger et al. | |
| 7,523,777 B2 | 4/2009 | Kim | |
| 7,541,082 B2 | 6/2009 | Yu | |
| D605,885 S | 12/2009 | Judkins | |
| 7,637,301 B2 | 12/2009 | Forst Randle | |
| 7,763,555 B2 | 7/2010 | Nguyen et al. | |
| 7,832,450 B2 | 11/2010 | Brace et al. | |
| D636,204 S | 4/2011 | Elinson et al. | |
| D640,472 S | 6/2011 | Colson et al. | |
| 7,984,743 B2 | 7/2011 | Rossato | |
| D646,516 S | 10/2011 | Ehrsam | |
| D663,147 S | 7/2012 | Cheng | |
| D668,090 S | 10/2012 | Colson et al. | |
| 8,459,326 B2 * | 6/2013 | Rupel | E06B 9/262 |
| | | | 160/84.04 |
| D685,210 S | 7/2013 | Josephson et al. | |
| D686,022 S | 7/2013 | Sevcik | |
| 8,568,859 B2 | 10/2013 | Yu et al. | |
| D693,600 S | 11/2013 | Jelic et al. | |
| 8,642,156 B2 | 2/2014 | Jessee, III | |
| 8,763,673 B2 | 7/2014 | Jelic et al. | |
| D711,156 S | 8/2014 | Judkins | |
| 9,249,618 B2 | 2/2016 | Sevcik et al. | |
| 9,382,754 B2 | 7/2016 | Malkan | |
| D764,836 S | 8/2016 | Rupel | |
| 2002/0043346 A1 | 4/2002 | Zorbas | |
| 2002/0043347 A1 | 4/2002 | Rupel | |
| 2004/0065417 A1 | 4/2004 | Vanpoelvoorde | |
| 2004/0079492 A1 | 4/2004 | Lin | |
| 2005/0155721 A1 | 7/2005 | Pon | |
| 2005/0155722 A1 | 7/2005 | Colson et al. | |
| 2006/0048901 A1 | 3/2006 | Nien | |
| 2006/0225846 A1 | 10/2006 | Marusak et al. | |
| 2006/0260272 A1 | 11/2006 | Swiszcz et al. | |
| 2007/0029052 A1 | 2/2007 | Nien et al. | |
| 2007/0074826 A1 | 4/2007 | Jelic et al. | |
| 2007/0183053 A1 | 8/2007 | Ellemor | |
| 2008/0083508 A1 | 4/2008 | Rossato | |
| 2008/0286569 A1 | 11/2008 | Husemann et al. | |
| 2009/0025888 A1 | 1/2009 | Brace et al. | |

(56) References Cited

U.S. PATENT DOCUMENTS

| | | | |
|---|---|---|---|
| 2009/0151878 A1* | 6/2009 | Konstantin | A47H 23/06 160/237 |
| 2010/0095535 A1 | 4/2010 | Akins et al. | |
| 2010/0126675 A1 | 5/2010 | Jelic et al. | |
| 2010/0139873 A1 | 6/2010 | Gardner | |
| 2010/0186903 A1 | 7/2010 | Liang et al. | |
| 2010/0276089 A1 | 11/2010 | Jelic et al. | |
| 2010/0288446 A1 | 11/2010 | Foley et al. | |
| 2010/0294439 A1 | 11/2010 | Su | |
| 2011/0088852 A1 | 4/2011 | Hu et al. | |
| 2012/0103537 A1 | 5/2012 | Dogger | |
| 2012/0175068 A1 | 7/2012 | Cleaver | |
| 2012/0175069 A1 | 7/2012 | Rupel et al. | |
| 2012/0193038 A1 | 8/2012 | Corey et al. | |
| 2013/0133840 A1 | 5/2013 | Malkan | |
| 2013/0180669 A1 | 7/2013 | Judkins | |
| 2014/0224432 A1 | 8/2014 | Josephson et al. | |
| 2014/0284004 A1 | 9/2014 | Sevcik et al. | |
| 2015/0041072 A1 | 2/2015 | Hsu et al. | |
| 2015/0322714 A1 | 11/2015 | Rupel | |
| 2016/0281420 A1 | 9/2016 | Malkan | |

FOREIGN PATENT DOCUMENTS

| | | |
|---|---|---|
| CA | 2344617 A1 | 10/2001 |
| CL | 43627 | 7/1996 |
| CN | 2545343 Y | 4/2003 |
| CN | 2862889 Y | 1/2007 |
| CN | 1965194 A | 5/2007 |
| CN | 101193995 A | 6/2008 |
| DE | 2843405 A1 | 4/1980 |
| DE | 29910899 U1 | 10/1999 |
| EP | 0427477 A2 | 5/1991 |
| EP | 0451912 A1 | 10/1991 |
| EP | 0779407 A1 | 6/1997 |
| EP | 1431506 A2 | 6/2004 |
| EP | 1479867 A2 | 11/2004 |
| EP | 1561896 A2 | 8/2005 |
| EP | 1561986 A1 | 8/2005 |
| EP | 1619348 A1 | 1/2006 |
| JP | 37-26369 | 9/1937 |
| JP | 5-231078 | 9/1993 |
| JP | 2000/185360 A | 7/2004 |
| JP | 2004/250858 A | 9/2004 |
| JP | 2005/139668 A | 6/2005 |
| JP | 2007/092245 A | 4/2007 |
| JP | 2009261523 | 11/2009 |
| TW | 141980 B | 9/1990 |
| TW | 145166 | 11/1990 |
| TW | 176206 B | 1/1992 |
| TW | M243150 | 9/2004 |
| TW | 200909663 A | 3/2009 |
| TW | I529297 B | 11/2016 |
| TW | 1563949 | 1/2017 |
| WO | 87/06187 A1 | 10/1987 |
| WO | 88/07345 A1 | 10/1988 |
| WO | 93/07353 A1 | 4/1993 |
| WO | 2005/110411 A1 | 11/2005 |

OTHER PUBLICATIONS

PCT International Search Report and Written Opinion dated Nov. 19, 2012, PCT Application No. PCT/US2012/52485, 17 pages.

PCT International Search Report dated Jan. 2, 2013, PCT Application No. PCT/US2012/052493, 4 pages.

Author Unknown, "Jindal Films", Jindal Films, Oppalyte 36MO747, Multi-Plastics, Inc., 4 pages, Jun. 15, 2010.

Author Unknown, "Roman Shades", seamstobe.com/Romanshades.htm, at least as early as May 26, 2009, 2 pages.

Author Unknown, "Understanding Roman Shades", terrelldesigns.com, at least as early as May 26, 2009, 4 pages.

Exxonmobil Chemical, "Oppalyte 36MO747 Oriented Polypropylene Film", Multi-Plastics, Inc. (Oct. 26, 2009), 3 pages.

Innovia Films, "Propafilm™ RD", www.innoviafilms.com (date unknown), 2 pages.

Plastics Technology, "No. 47—Biaxial Film Orientation: Plastics Technology", http://www.ptonline.com/articles/no-47---biaxial-film-orientation, (Oct. 2005), 2 pages.

Author Unknown, Jindal, Bicor 42MB777 Oriented Polypropylene Films, retrieved from (http:/www/jindalfilms.com/wp-content/uploads/Jindal-products/productpdf/Bicor_42MB777_SI_102.pdf), 2013, 3 pages.

Taiwan Intellectual Property Office Office Action (Translation), dated May 8, 2017 (4 pages).

\* cited by examiner

FEATURE FOR INHIBITING LIGHT STRIPE BETWEEN CELLULAR ELEMENTS IN A COVERING FOR AN ARCHITECTURAL OPENING

CROSS-REFERENCE TO RELATED APPLICATIONS

This application is the national stage application of International Patent Application No. PCT/US2012/052473, filed Aug. 27, 2012, and entitled "Feature For Inhibiting Light Stripe Between Cellular Elements in a Covering For an Architectural Opening," which claims the benefit under 35 U.S.C. § 119(e) of U.S. Provisional Patent Application No. 61/528,028, filed Aug. 26, 2011 and entitled "Feature For Inhibiting Light Stripe Between Cellular Elements in a Covering For an Architectural Opening", which are hereby incorporated herein by reference in their entireties.

FIELD

The present invention relates generally to coverings for architectural openings and more specifically to cellular coverings for architectural openings.

BACKGROUND

Coverings for architectural openings, such as windows, doors, archways, and the like, have taken numerous forms for many years with some of these coverings being retractable in nature so as to be movable between an extended position across the opening and a retracted position adjacent one or more sides of the opening.

More recently, retractable coverings have been made in a cellular format. The cells in such coverings are typically elongated tubes or cells that extend laterally across an opening. When the covering is open and extended across a window opening, the cells are themselves expanded, but when the covering is retracted, the cells collapse so that each cell is stacked with the adjacent cell, and collectively are stacked together in a small space.

SUMMARY

Examples of the disclosure include a covering for an architectural opening. The covering includes a cellular panel having at least two cellular units or rows stacked on top of the other. The covering also includes a first light absorbing element positioned at an interface between the at least two cellular units. The first light absorbing element may absorb substantially all visible light wavelengths. Each cellular unit may include an outer cell and an inner cell at least partially received within the outer cell. At least a portion of an outer surface of the inner cell may be exposed at the interface such that the outer cell of another cellular unit is positioned adjacent the exposed portion of the inner cell. The first light absorbing element may be positioned on the inner cell or the outer cell. In one configuration, the first light absorbing element is positioned on an outer surface of the inner cell exposed at an interface between adjacent cellular units. The covering further may include a second light absorbing element positioned on an opposite side of the interface from the first light absorbing element.

Other examples of the disclosure include a cellular panel for covering an architectural opening. The cellular panel includes a first cellular row and a second cellular row operably connected to the first cellular row. The first cellular row includes a first outer cell and a first inner cell at least partially received within the first outer cell. Similarly, the second cellular row includes a second outer cell and a second inner cell at least partially received within the second outer cell. The first inner cell and the second inner cell may be a light absorptive material. The cellular panel also includes a first light absorbing element positioned at an interface between the first cellular row and the second cellular row. The first light absorbing element may be positioned on an outer surface of the second inner cell, and the first outer cell may define a gap through which the first light absorbing element is exposed. Additionally or alternatively, the first light absorbing element may be positioned adjacent a first longitudinal edge of the first inner cell. In some configurations, the cellular panel includes a third cellular row operably connected to the second cellular row, and a second light absorbing element positioned adjacent an interface between the second cellular row and the third cellular row. In these configurations, the first and second light absorbing elements may have different widths. For example, the second light absorbing element may have a smaller width than the first light absorbing element.

Still other examples of the disclosure include a covering for an architectural opening. The covering includes a head rail, a cellular panel, and a bottom rail. The cellular panel is operably connected to the head rail and includes at least two cellular units. Each cellular unit of the panel includes an outer cell and an inner cell at least partially received within the outer cell. The cellular panel further includes a first light absorbing element positioned at an interface between the at least two cellular units. Furthermore, the bottom rail is operably connected to an opposite end of the cellular panel from the head rail and moves vertically as the covering moves between an extended position and a retracted position. The first light absorbing element may be embedded in at least one of the inner cell or the outer cell and absorb substantially every visible light wavelength. The first light absorbing element may be dyed Mylar that absorbs substantially every light wavelength. In some configurations, at least a portion of an outer surface of the inner cell may be exposed at an interface between adjacent cellular units such that the outer cell of another cellular unit is positioned adjacent the inner cell. In these configurations, the first light absorbing element may be positioned on the inner cell, and the element may further be positioned at the portion of the outer surface of the inner cell that is exposed at the interface.

This summary of the disclosure is given to aid understanding, and one of skill in the art will understand that each of the various aspects and features of the disclosure may advantageously be used separately in some instances, or in combination with other aspects and features of the disclosure in other instances.

DETAILED DESCRIPTION

Overview

Figure 1A:
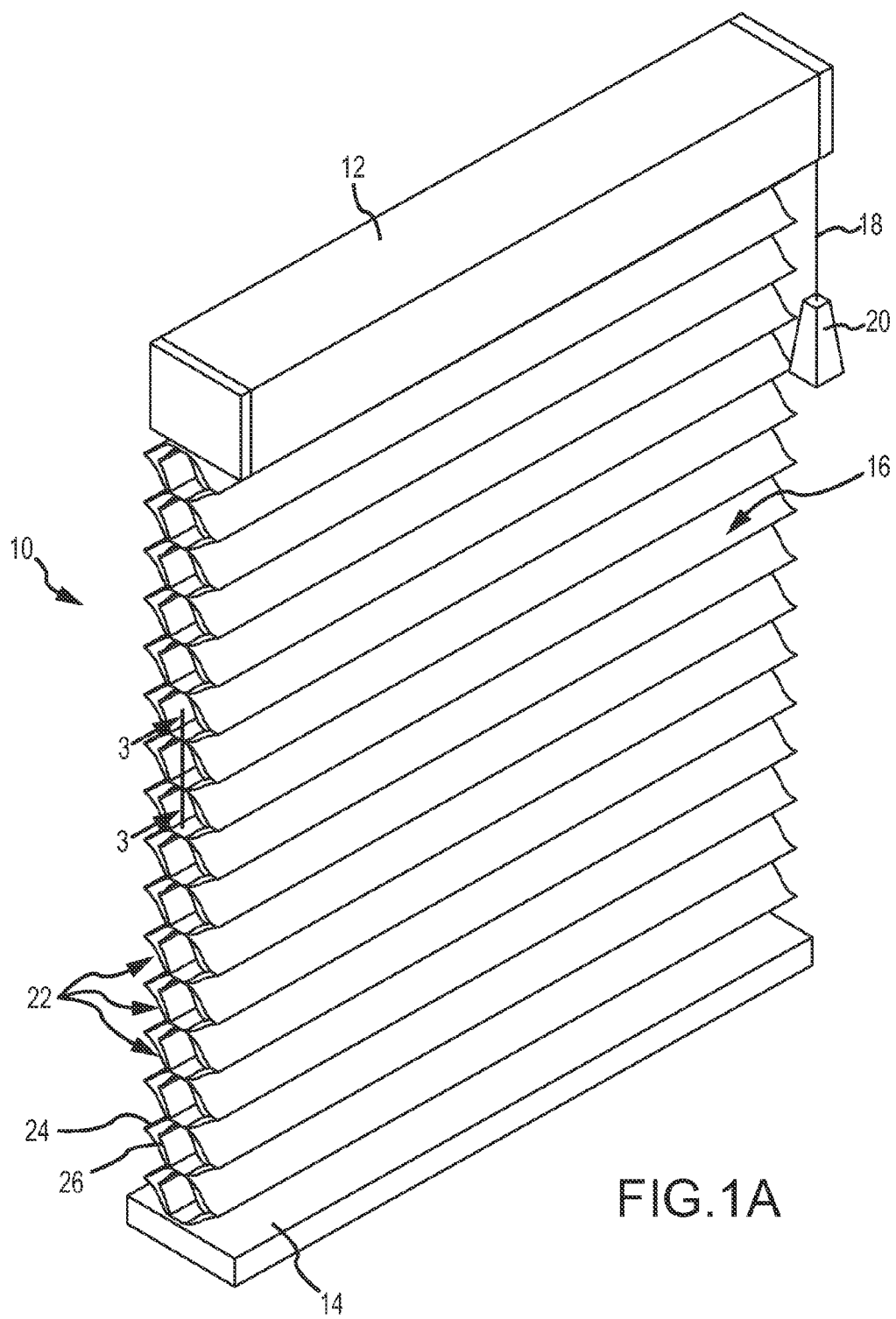
FIG. 1A is an isometric view of a covering for an architectural opening.

A cellular covering typically includes a plurality of elongated vertically aligned, laterally extending, transversely collapsible cells which are longitudinally adhered to upper and lower adjacent cells to form a vertical stack of cells. The transverse cross-section of each cell can take numerous forms such as hexagonal, octagonal, or variations thereof. While such coverings utilizing transversely collapsible cells are typically oriented so the cells extend laterally or horizontally, panels of such material can also be oriented so the cells extend vertically or at an angle between horizontal or vertical.

In some embodiments herein, a cellular shade is disclosed. The panels of the cellular covering are generally formed by assembling each cell of a cellular unit from one or more strips of material folded, bent or creased along lines extending longitudinally along the length of the material. Each formed cell is then attached along a top attachment line to a cell positioned adjacent to but above the cell. The cell is also generally attached along a bottom attachment line to a cell positioned adjacent to but below the cell. In this way a stacked cell panel is formed.

The cellular units are attached together along the attachment lines (top and bottom) by a thin layer of adhesive having adjustable widths to securely connect the cells to above and below adjacent cells to form the panel. Typically, both the outer and inner cells are made of a woven, non-woven, or knit material. The non-woven material may include natural or synthetic fibers and a resin to bond the fibers.

In connecting the cells together the light permeability of the covering may be affected, as light may be able to pass through the lines of connection between each adjacent upper and lower cell. This may prevent the covering from completely blocking light (which may be desired in some instances), as well as may adversely affect the insulative qualities of the covering.

To substantially prevent or significantly reduce the light from passing through the lines of connection between each adjacent upper and lower cell, a light absorbing element is positioned at the interface between the cells. The light absorbing element is formed in a line that extends along the length of a cell in the interface regions between adjacent cells. The light absorbing element may be continuous or segmented, may be linear or curved, may have varying widths, and may have varying thicknesses. The light absorbing element may be formed as an integral part of a cell or may be a separate component attached to the cell. For example, the light absorbing element may be a dye applied to the surface of, or embedded in, a strip of material forming the cell. Additionally or alternatively, the light absorbing element may be a separate piece of material, such as a thin layer of plastic having light absorbing qualities, attached to a surface of a cell. The light absorbing element may be various colors, including dark colors, depending on the desired light absorption. Furthermore, the light absorbing element may be positioned at various locations where light seepage may occur between adjacent cells, such as between adjacent cells, between inner and outer cells, or both. In this manner, light which may pass through a rear or road side of a cellular panel at the connection interface between cells may be absorbed by the light absorbing element instead of being transmitted to a front or room side of the cellular panel.

DESCRIPTION OF THE FIGURES

Figure 1B:
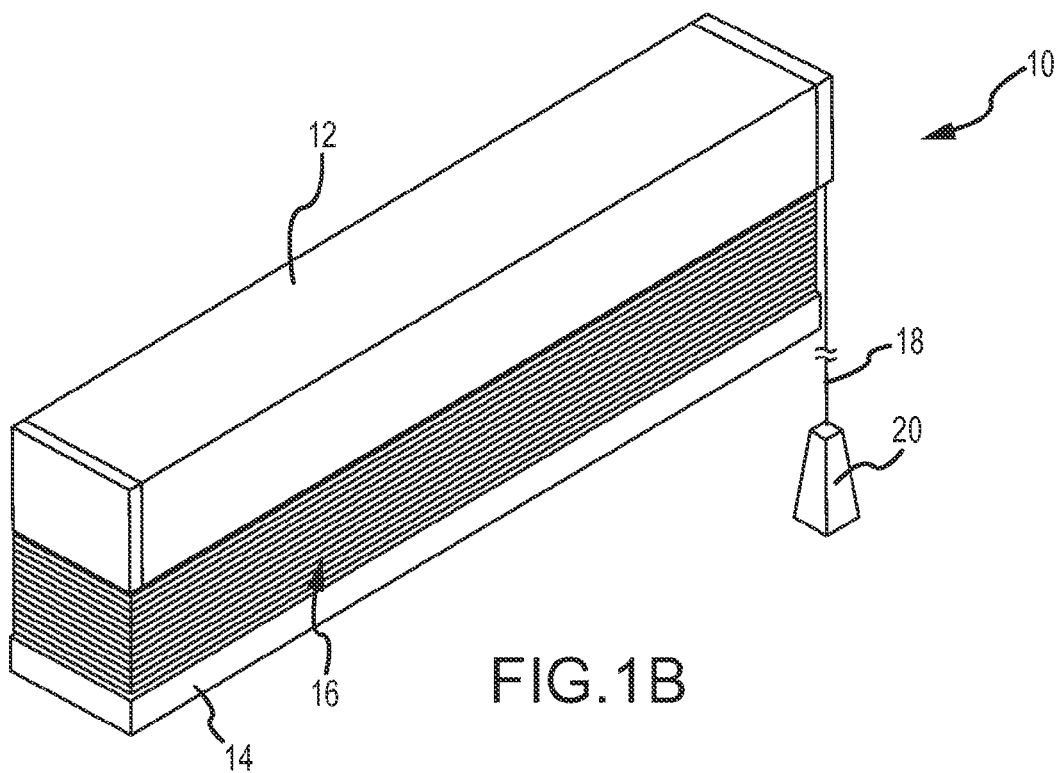
FIG. 1B is an isometric view of the covering of FIG. 1A in a retracted position.

Referring to FIGS. 1A and 1B, a cellular panel 16 includes a plurality of cellular units 22. Each cellular unit 22 is operably connected to at least one adjacent cellular unit 22. The cellular units 22 are attached along lines of attachment or interface regions. The combination of cellular units 22 form the cellular panel 16. Each cellular unit 22 may include one interior volume (single cell), two interior volumes (double cell) defined by an outer cell 24 and an inner cell 26, or more interior volumes in some configurations. If the cellular unit 22 is a double cell, the inner cell 26 may be substantially received within the outer cell 24. The two cells 24, 26 may be operably connected together (e.g., via adhesive, stitching, or other fasteners). The two cells 24, 26 form a single row or cellular unit 22. At or near the connection location or interface of each cellular unit 22, either or both the outer cell 24 and the inner cell 26 may include a light absorption element. The light absorption element may be positioned adjacent or at the connection point or interface between cells 24, 26 and/or cellular units 22.

FIG. 1A is an isometric view of a covering 10 for an architectural opening in an extended position. FIG. 1B is an isometric view of the covering 10 in a retracted position. The covering 10 may include a head rail 12, a bottom or end rail 14, and a flexible cellular panel 16 interconnecting the head rail 12 and the bottom rail 14. The covering 10 may be moved from the extended position illustrated in FIG. 1A to the retracted position illustrated in FIG. 1B by operating a control cord 18 having a tassel 20 located on a free end of the control cord 18. The control cord 18 may be connected to a lift mechanism (such as lift cords, not shown). The lift mechanism may extend through the panel 16 from the head rail 12 to the bottom rail 14 and is operative to lift the bottom rail 14 towards the head rail 12. The covering 10 may include a cord lock (not shown) within the head rail 12 to secure the control cord 18 to maintain the panel 16 at a desired position between fully extended and fully retracted. To extend the covering 10, the tassel 20 may rise, providing extra length to the lift mechanism, and the bottom rail 14 (through gravity) may drop. In other examples, the covering 10 may include alternate control mechanisms, such as an automatic or motorized system, pulley system, and so on.

Referring still to FIGS. 1A and 1B, the panel 16 includes a plurality of cellular units 22 or rows. Each cellular unit 22 extends horizontally or laterally across the width of the panel 16 and are vertically aligned with each other cellular unit 22. Each cellular unit 22 is operably connected along its length to immediately adjacent upper and lower cellular units 22 (described in more detail below). Additionally, each cellular unit 22 is transversely collapsible, such that as the covering 10 is retracted, the cellular units 22 reduce in height and stack together. For example, the cross-sectional area of each cellular unit 22 taken at a right angle with respect to the length of the panel 16 collapses in a desired way to allow stacking.

Figure 2A:
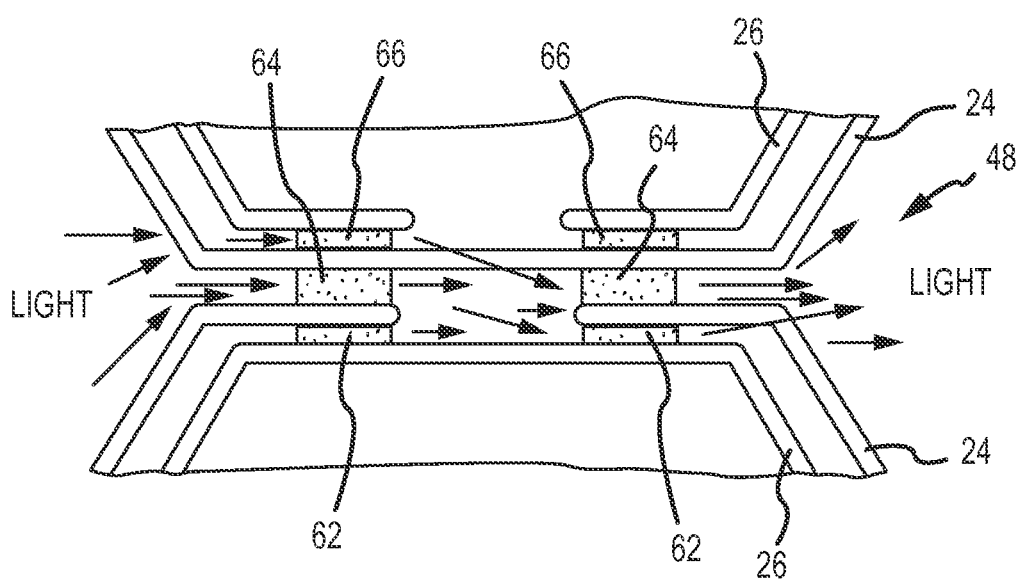
FIG. 2A is an enlarged side elevation view of an interface between adjacent cellular units of a cellular panel.

Referring to FIGS. 2B through 6 (FIG. 2A is referred to below), each cellular unit 22 may include an outer cell 24 and an inner cell 26 at least partially received within the outer cell 24. The outer cell 24 may be formed from a long, narrow strip of material having generally parallel longitudinal edges 28. The strip is generally bent around lines of curvature extending along the length of the strip to form a generally tubular structure. When the outer cell 24 is formed into the hollow tubular cell shape, the edges 28 may be positioned substantially adjacent to but spaced away from one another to define a gap 29. In these examples, a portion of the inner cell 26 (e.g., the top wall of the inner cell 26) may be exposed through the gap 29.

Figure 5:
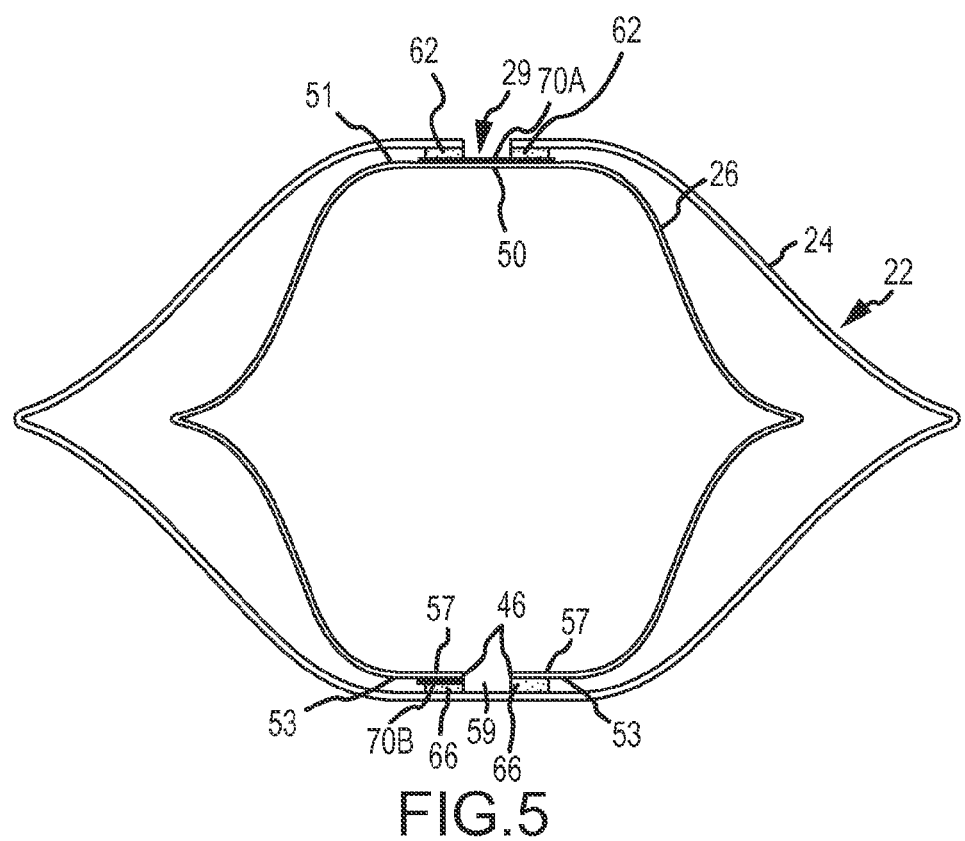
FIG. 5 is a side elevation view of a cellular unit.
Figure 5A:
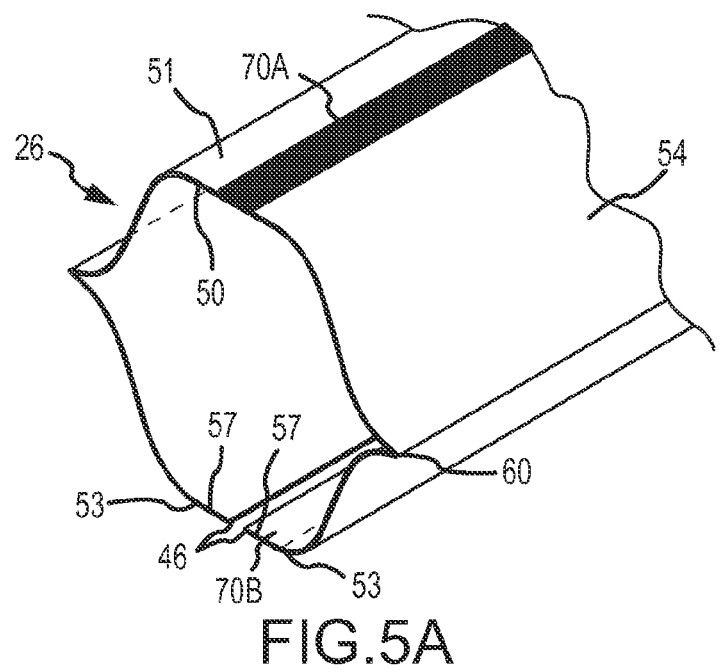
FIG. 5A is a top isometric view of an example of an inner cell.
Figure 5B:
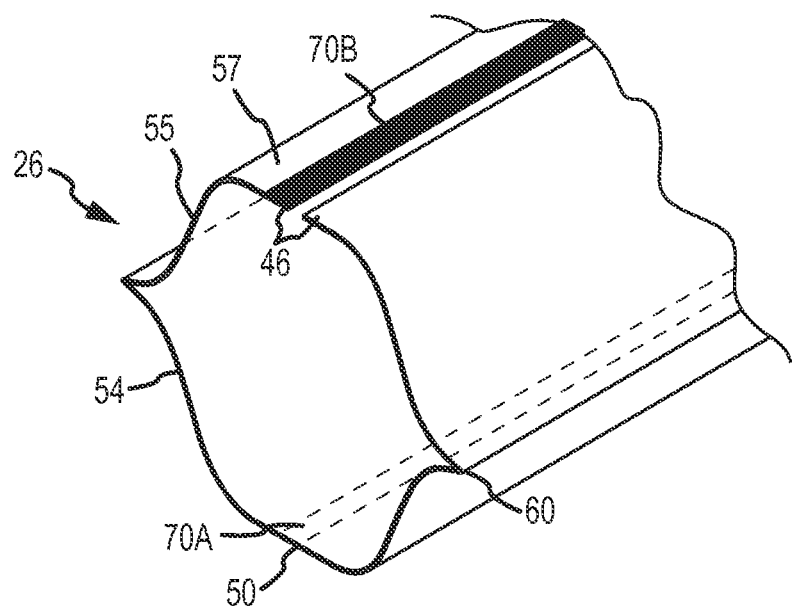
FIG. 5B is a bottom isometric view of the inner cell of FIG. 5A.
Figure 5C:
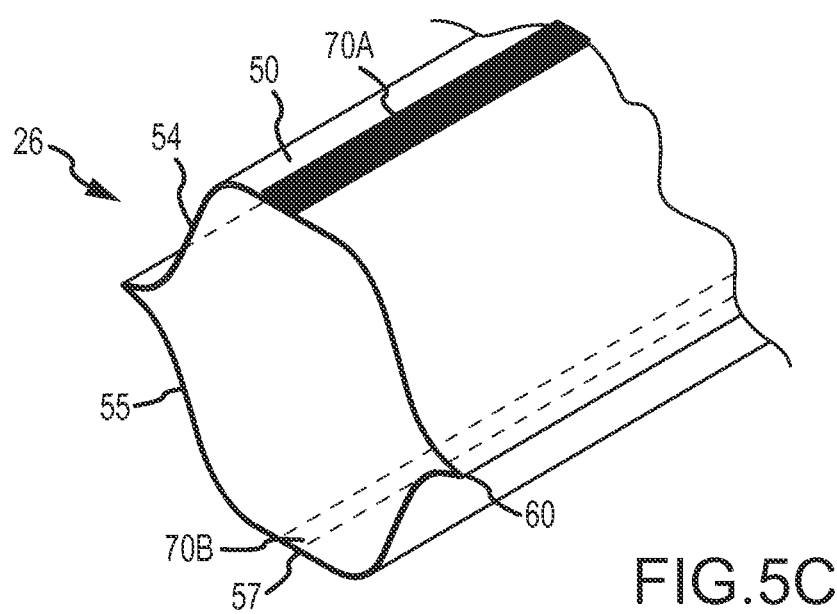
FIG. 5C is a top isometric view of another example of an inner cell.

In other examples, the edges 28 may be positioned directly adjacent (including touching) or even overlapping each other, so that there may be substantially no gap between each edge 28, see, e.g., FIG. 5C. As the outer cell 24 may be formed from a single strip of material, the bottom 36 of the cell 24, which may be positioned on an opposite side from the edges 28, may be substantially continuous with no gap formed. The edges 28 of the outer cell 24 may define a top wall 42 of the cell 24, so that each cell may have a top wall 42, a bottom wall 36, and opposing sidewalls 30. Each opposing sidewall may define an outer crease 34.

Still referring to FIGS. 2B through 6, the outer cell 24 may include upper sidewalls 30 descending downwardly and outwardly from the edges 28. An inner surface 33 of the sidewalls 30 may face towards the inner cell 26 and an outer surface 35 of the sidewalls 30 may face towards the room or architectural opening. The longitudinal outer crease 34 may be substantially equally spaced from the edges 28 and extend coextensively to one another. Each crease 34 may be at least partially pointed and may provide a bend or fold line along the length of the outer cell 24. When the cellular panel 16 is retracted and the cell collapses to stack, the sidewalls of the outer cell 24 fold along the crease 34. For example, the outer cell 24 may collapse at the crease line 34 when the bottom rail 14 retracts the cellular panel 16. Below the crease line 34, the material forming the outer cells 24 transitions to form the bottom sidewalls 31 that extend downward and away from the crease line 34 to form the bottom 36 of the outer cell 24.

As shown in FIGS. 2B through 5 and 6, the inner cell 26 may have substantially the same cross-sectional shape and structural features as the outer cell 24. The inner cell 26, when the cellular panel 16 is extended, engages the outer cell 24 at its top and bottom walls 42 and 36, thus forming a gap between adjacent sidewalls. The inner cell 26 may be formed from a strip of material that may include parallel edges 46 (see, e.g., FIGS. 7-9). In some implementations the inner cell 26 may be inverted relative to the outer cell 24. For example, the longitudinal edges 46 may be operably connected to the bottom 36 of the outer cell 24 and a continuous top wall 50 of the inner cell 26 may be connected to the edges 28 (forming the top wall 42) of the outer cell 24. Additionally, the inner cell 26 may include two upper sidewalls 54 extending upward and outward from the edges 46 and two lower sidewalls 55 extending below the creases 60 and transitioning into the bottom 57, which includes longitudinal edges 46. Like the outer cell 24, the inner cell 26 collapses along the sidewall creases 60 when the cellular panel 16 is retracted and the cells are stacked.

The sidewalls 54, 55 of the inner cell 26 may be positioned such that an outer surface of the sidewall 54, 55 faces the outer cell 24 and inner surface 21 faces inwards towards the opposite sidewall 54, 55. The upper sidewalls 54 transition to form the lower sidewalls 55 at the crease 60, and like the crease 34 in the outer cell 24, the crease 60 may allow the inner cell 26 to collapse when the cellular panel 16 is retracted. The crease 60 of the inner cell 26 may be approximately aligned and coextensive with the crease 34 in the outer cell 24, such that the two cells 24, 26 may fold in longitudinal alignment with one another.

It should be noted that in some implementations either or both the inner cell 26 and the outer cell 24 may be formed so that there may not be a gap between the edges 28, 46, and instead only a seam where the edges abut or overlap. For example, FIG. 5C is an isometric view of the inner cell 26 formed without a gap between the edges 46. The outer cell 24 may be similarly formed so that there may not be a gap 29 between the edges 28. Alternatively, each of the inner and outer cells 26, 24 may be formed of two or more strips of material, and thus there may be gaps or seams formed at both the top and bottom of each respective cell.

Similarly, in some examples, the cross-sectional shape of the outer cell 24 and the inner cell 26 may be varied from one another. For example, the inner cell 26 may have a circular cross-section whereas the outer cell 24 may have an hexagonal cross-section.

With continued reference to FIGS. 2B through 5 and 6, the outer cell 24 and the inner cell 26 may have a similar shape, although the inner cell 26 may be smaller than the outer cell 24. The two cells 24, 26 may provide insulation as each cell 24, 26 may trap air; thus, creating pockets of air between a first side of the cellular panel 16 and a second side of the cellular panel 16. The two cells 24, 26 may be substantially any shape, but may each generally define a volume. The volume defined by each cell 24, 26 may generally include at least two openings, e.g., one on each side of the cellular unit 22 on each side of the covering 10. The defined volume, as described above, may function to capture air in order to provide insulation. Additionally, as the cellular panel 16 is retracted, the volume for each cell 24, 26 may decrease as the cellular unit 22 collapses transversely.

Additionally, the two cells 24, 26 may cooperate to prevent light from being transmitted through the cellular panel 16. For example, either or both the outer cell 24 and the inner cell 26 may include visible wave-length blocking or reflecting materials. In one example, the inner cell 26 may be made of a light blocking material (e.g., Mylar) and the outer cell 24 may be made of another material (either translucent or opaque). The material may be a knit, woven, or non-woven material, or may be a fabric, and also may be made of man-made, natural, or a combination of materials.

In this example, the cellular panel 16 may have an improved aesthetic appearance, while still providing light blocking functions. Furthermore, the two cells 24, 26 may also provide insulation from sound waves as sound wavelengths may be reduced as from a first side of the panel 16 to a second side of the panel 16. It should be noted that other materials are possible for the cells 24, 26 and the materials listed herein are examples only.

With reference to FIGS. 2A through 5 and 6 through 9, the outer cell 24 and the inner cell 26 may be operably connected together in various manners. The inner cell 26 and outer cell 24 may be connected together via adhesive 62 positioned on an outer surface of the top wall 50 of the inner cell 26. In some implementations, there may be a line of adhesive 62 for each edge 28 of the outer cell 24. Additionally, the two cells 24, 26 may be connected together at a second location. The inner cell 26 may include adhesive 66 positioned along an outer bottom surface of the edges 46. As with the adhesive 62, there may be two lines of adhesive 66 for each edge 46 of the inner cell 26.

Figure 2B:
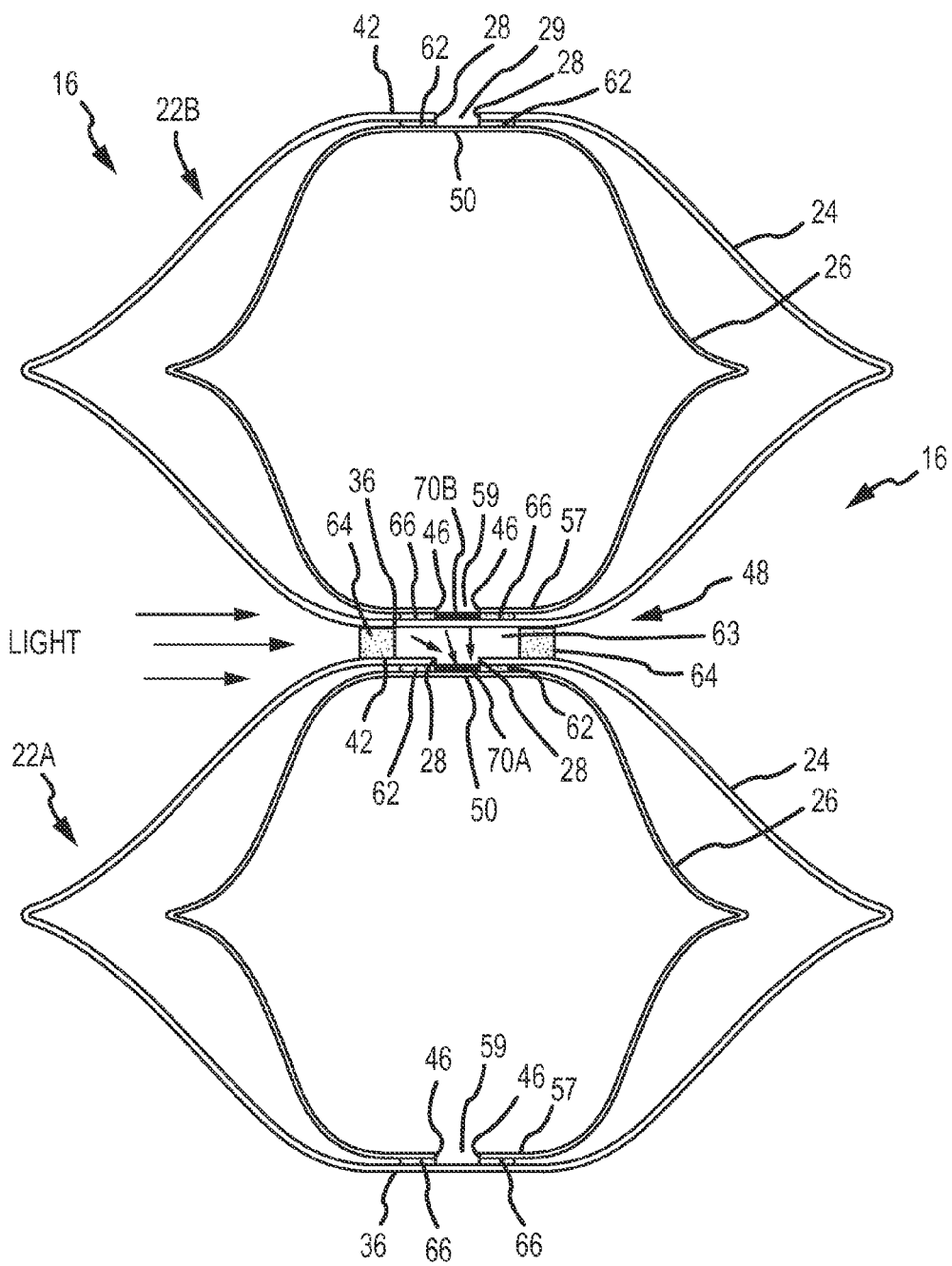
FIG. 2B is an enlarged side elevation view of a cellular panel including a light absorbing element.
Figure 3:
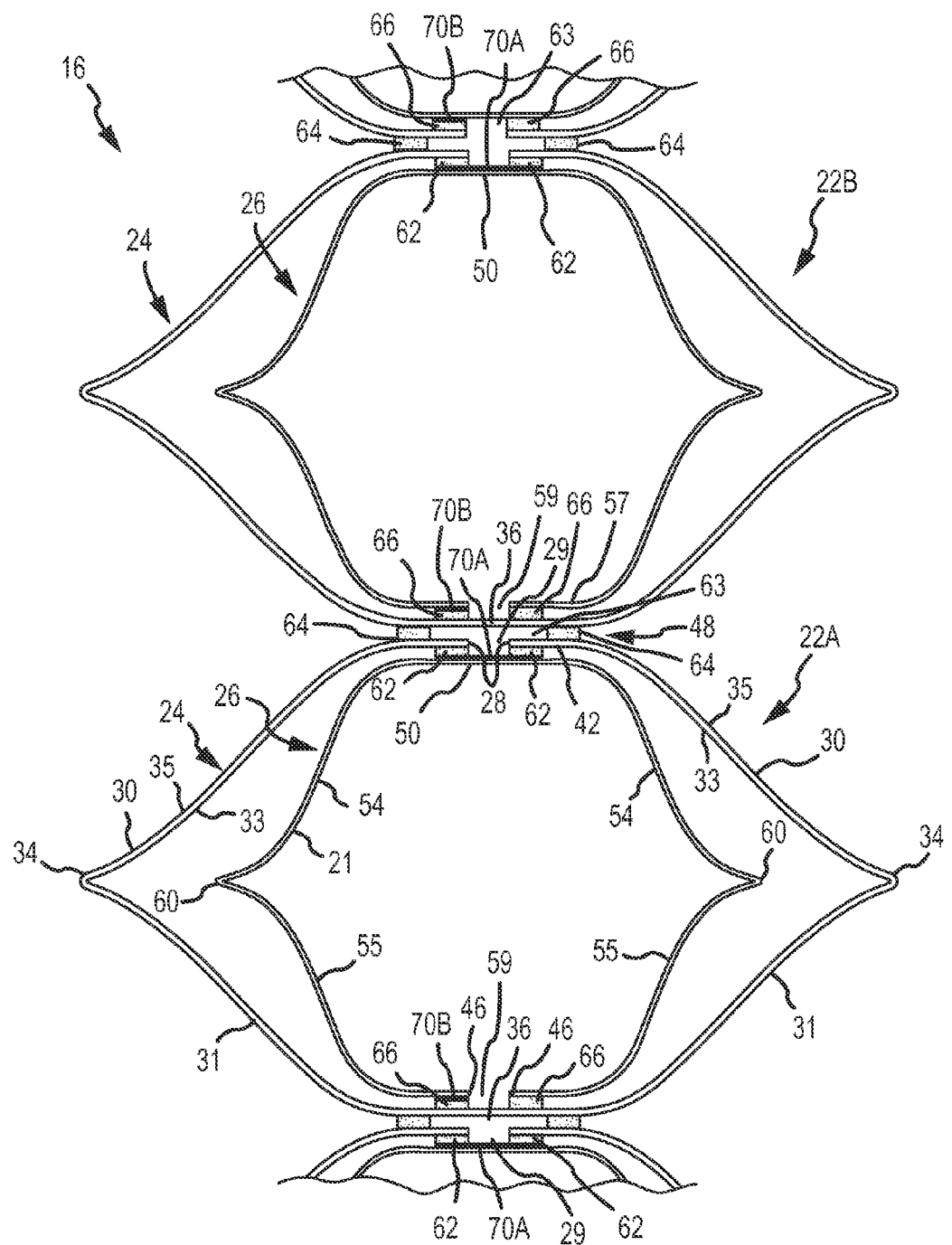
FIG. 3 is an enlarged side elevation view taken along line 3-3 of FIG. 1A.

The first cellular unit 22A and the second cellular unit 22B may be connected at an interface 48, as shown in FIGS. 2B and 3, such that a top surface of the first cellular unit 22A may be aligned with and positioned adjacent to a bottom surface of the second cellular unit 22B. The cellular units 22A, 22B may be operably connected together via adhesive lines 64 positioned on a top outer surface of each outer cell 24. It should be noted that a line of connection between the cellular units 22A, 22B may include more than one line of adhesive 64. Together the adhesive lines 64 may form a linear connection region along the length of the cellular units 22A, 22B.

Referring to FIG. 2A, in some cellular panels where each cell is made of material or is otherwise fashioned to at least partially block light from passing therethrough, light may leak through the connection locations 48 between cell rows, forming a light stripe between the cells when viewed from the front or room side of the cells. For example, light from a rear or road side of the cellular panel may be transmitted or reflected through adhesive 64, or through the material forming the cells (if non-light blocking material), or a combination of both. Light banding or stripes may occur at various aspect ratios of the adhesive. As shown in FIG. 2A, the light may be transmitted through the connection locations 48 in various directions, as the adhesive 64 (or other connection mechanism) may partially refract the light. The light scattering at the junction of two adjacent cells may be due to cell material, such as a fabric, having an uneven surface profile, the openness and/or porosity of the material, and/or any reflective surfaces associated with the cells.

In these cellular panels, even though the outer cell and/or inner cell may include light reflecting or non-light transmitting material, light may thus be transmitted through the panel. The light leaking through the connection location between the cells passes through or around the adhesive used to connect adjacent cells together. In one example, this causes stripes of light to be seen between cells when in a darkened room with a cellular shade having blackout material on the cells.

With reference to FIGS. 2B through 9, the cellular unit 22 may include a light absorbing element 70 for blocking or absorbing light so that the light passing between the adjacent cells is reduced or eliminated. This element 70 thus can reduce or eliminate the light stripe problem. For example, a black band may be associated with an interface 48 and absorb substantially all of the scattered light in-between adjacent cells. The cellular unit 22 may include one or more light absorbing elements 70 and each light absorbing element 70 may be positioned at various locations on either or both cells 24, 26. In one example, a printed black band or strip is positioned on the inner cell 26. The position of the light absorbing element 70 may be determined based on the locations of the adhesive connecting the cellular units 22A, 22B, as well as the type of material of the outer cell 24. For example, if the outer cell 24 is made of material that transmits light, the inner cell 26 may include the light absorbing element 70 although the light absorbing element may be partially covered by the outer cell 24. This is because the light absorbing element 70 may absorb any light that may pass through the outer cell 24, as well as light that passes through the connection locations between the cellular units 22A, 22B.

The light absorbing element 70 absorbs a sufficient amount of visible light that would normally pass through the gap between the adjacent cells. The light absorbing element may by itself effectively absorb sufficient light to largely mitigate the light stripe effect between adjacent cells, or it may work in conjunction with the other structural features in the connection region (the adhesive strips, the cell material) to mitigate or largely eliminate the light stripe between adjacent cells. Thus, the light that passes through or escapes between the cells through the connection region to cause the light stripe is absorbed or otherwise blocked by the light absorbing element 70 alone or in combination with the other cell structure in the vicinity of the connection region. In some examples, the light absorbing element 70 is not a structural part of the interface 48 between adjacent cellular units 22. In other words, in some examples, the light absorbing element 70 does not connect adjacent cellular units 22 together or transfer loads across an interface 48. In this manner the light absorbing element may be distinct from the fastening or attachment mechanism or means used to connect or couple one cellular unit to an adjacent cellular unit. In some examples, the light absorbing element 70 is a structural part of the interface 48 between adjacent cellular units 22. In some example, adhesive used to connect cells 24, 26 or cellular units 22 may be colored with a dye, such as a black dye, and function as a light absorbing element in addition to at least partially securing cells or portions of cells together. Where colored adhesive is utilized as a light absorbing element as well, the adhesive may be positioned in locations as shown and described here, and/or may be additionally positioned where the separate light absorbing elements are located.

Still referring to FIGS. 2B through 9, the light absorbing element 70 may be a black material, such as an ink or dye, or may be a separate piece or pieces of sheet material closely bonded to the cell material, and positioned in the connection region interface between cellular units 22A and 22B. In one example, the light absorbing element 70 may be a black-colored dye applied to the strip of material forming the inner cell 26 (see, e.g., FIGS. 7-9). The light absorbing element 70 may also be positioned on the strip of material forming the outer cell 24 at the appropriate locations. One example of suitable dye or ink is a black ink, FAB-PX00, Fabrasflex Black FR sold by Tokyo Ink, and is applied on the strip of material in a layer having a thickness of approximately 0.08 mils, or approximately 2.1 microns. One example of the light absorbing element 70 being a separate piece of sheet material is a thin layer of a dark colored plastic having visible light absorbing qualities and sufficiently bonded in the same or similar locations as the ink is applied to the strip of cell material, and sufficiently secure to provide an adequate anchor for the adhesives used to connect the adjacent cells together. In this manner, light which may pass through a first side of the cellular panel 16 at the connection interface 48 between cellular units 22 may be absorbed by the light absorbing element 70 and may not be transmitted to the other side of the cellular panel 16.

In other examples, the light absorbing element 70 may be other dark colors, such as but not limited to, brown, grey, navy blue, dark blue, dark brown, or dark green. Furthermore, each cell 24, 26 may include multiple light absorbing elements 70 positioned at various locations where light seepage may occur.

Referring particularly to FIG. 2B, the cellular panel 16 includes a light absorbing element 70, which substantially prevents or significantly reduces the light from seeping, leaking, or otherwise being transmitted through the connection locations 48 or interfaces between the cell rows 22. As shown in FIG. 2B, light that enters the adhesive 64 or otherwise enters the connection locations (e.g., through the outer cell material) is largely absorbed and substantially prevented from passing through the interface 48 between the adjacent cellular units 22A, 22B of the panel 16. Thus, depending on the material and dimensions of the cellular panel 16, the cellular panel 16 may be able to substantially prevent any light transmission therethrough. This may allow for the cellular panel 16 to be used to create "dark rooms" and other areas where light may be not be desired. Further, the cellular panel 16 may offer increased thermal insulation properties, as less light may be transmitted through the panel 16 to heat a room. However, as the cellular panel 16 may be extended and retracted, the light transmitted through a particular architectural opening may be able to vary from approximately 0 percent to approximately 100 percent.

The cellular panel 16 in FIG. 2B includes a lower cellular unit 22A and an upper cellular unit 22B connected to each other by a pair of longitudinally extending, laterally separated adhesive lines 64. Each cellular unit 22A, 22B includes an inner cell 26 and an outer cell 24 connected together with additional adhesive lines 62, 66. In particular, two longitudinally extending, laterally separated lines of adhesive 62 connect corresponding top walls 42, 50 of the outer and inner cells 24, 26, respectively. Similarly, two longitudinally extending, laterally separated lines of adhesive 66 connect corresponding bottom walls 36, 57 of the outer and inner cells 24, 26, respectively.

Each inner cell 26 in FIG. 2B has a continuous top wall 50 and a discontinuous bottom wall 57, whereas each outer cell 24 has a discontinuous top wall 42 and a continuous bottom wall 36. Thus, the adhesive lines 62 are aligned with longitudinal edges 28 of the discontinuous top wall 42, extend laterally outwardly from the edges 28, and are disposed between the corresponding top walls 42, 50. Similarly, the adhesive lines 66 are aligned with longitudinal edges 46 of the discontinuous bottom wall 57, extend laterally outward from the edges 46, and are disposed between the corresponding bottom walls 36, 57.

The adhesive lines 62, 66 may be symmetrical about a horizontal plane bisecting the interface 48 between the lower and upper cellular units 22A, 22B. In addition, the adhesive lines 62, 66 may be symmetrical about a vertical plane bisecting the interface 48 between opposite sides of the panel 16. Within the interface region 48, the lines of adhesive 62, 66 may be positioned laterally inward, or between, the lines of adhesives 64. As shown in FIG. 2B, a gap 29 is formed laterally between the longitudinal edges 28 and the lines of adhesive 62. Similarly, a gap 59 is formed laterally between the longitudinal edges 46 and the lines of adhesive 66. The gaps 29, 59 may oppose each other within the interface 48.

Figure 2C:
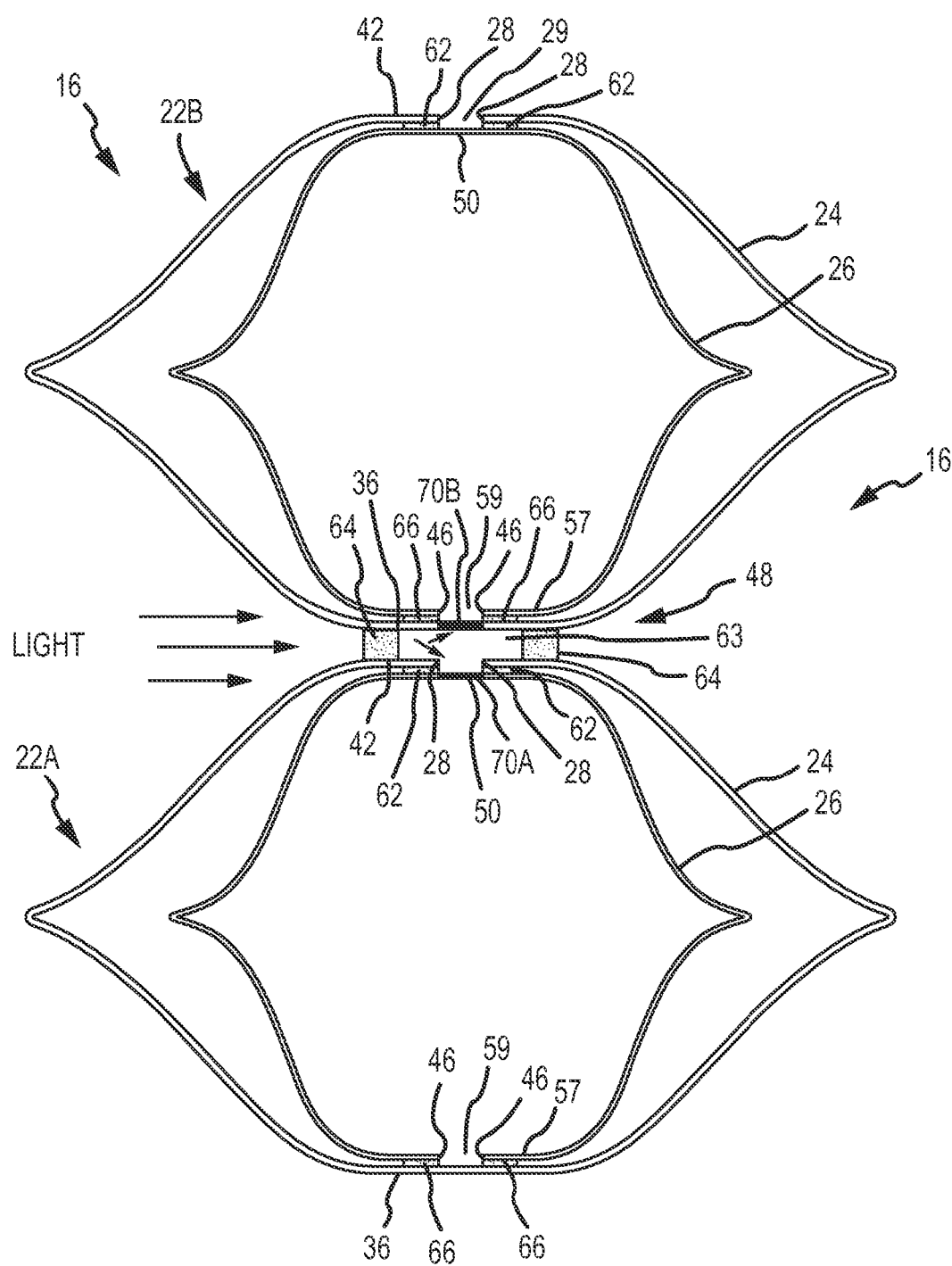
FIG. 2C is an enlarged side elevation view of the cellular panel of FIG. 2B with a light absorbing element embedded in a cell wall.

Still referring to FIG. 2B, multiple light absorbing elements 70A, 70B are positioned at the interface 48 between the adjacent cellular units 22A, 22B. A first light absorbing element 70A is associated with the lower cellular unit 22A and generally is positioned at a lower portion of an interior space 63 of the interface 48. More specifically, the first light absorbing element 70A is positioned on the top wall 50 of the lower cellular unit 22A in the gap 29 and extends laterally across the entire width of the gap 29. The first light absorbing element 70A has approximately the same height as each line of adhesive 62 and is recessed as compared to the upper wall 42 of the outer cell 24. In an alternative example, as shown in FIG. 2C, the first light absorbing element 70A may be embedded in and/or integral with the cell material, and be coextensive in height with the top wall 50 of the inner cell 26. In an alternative example, as shown in FIG. 2C, the second light absorbing element 70B may be embedded in and/or integral with the cell material, and be coextensive in height with the bottom wall 36 of the outer cell 24. Additionally, the light absorbing element may embedded in only a portion of the height (layer thickness) of the cell material. Referring back to FIG. 2B, the width of the first light absorbing element 70A is greater than its height. In one implementation, the first light absorbing element 70A may have an aspect ratio of at least 5:1. The full width of the outer and/or inner cells 24, 26 may be printed with, colored with, or overlayed by a dark color, such as black, which acts as a light absorbing element. The thickness of the printed area or light absorbing element 70 may be thin, and thus the aspect ratio of light absorbing element 70 may be relatively large. For example, in some examples, an aspect ratio of the light absorbing element 70 is between approximately 320:1 and approximately 50,000:1.

As shown in FIG. 2B, the first light absorbing element 70A is exposed to the interior space 63 of the interface 48 and is centrally located on the top wall 50 of the inner cell 26, laterally equidistant between the lines of adhesive 62, 64, and 66. In this location, the first light absorbing element 70A absorbs light that is refracted or directed downward from the various features associated with the interface region 48, including the lines of adhesive 62, 64, 66, the outer cells 24, and the inner cells 26 (in configurations where the outer cell 24 of the lower and/or upper cellular units 22A, 22B is light permeable). In FIG. 2B, light has been refracted from the adhesive 64 and/or reflected from the bottom wall 36 towards the first light absorbing element 70A, as represented by the arrows disposed within the interface 48. The first light absorbing element 70A absorbs the light to substantially reduce or eliminate the light from being transmitted through the interface 48.

In FIG. 2B, a second light absorbing element 70B is associated with the upper cellular unit 22B and generally is positioned at an upper portion of the interior space 63 of the interface 48. The second light absorbing element 70B is positioned above the bottom wall 36 of the outer cell 24 of the upper cellular unit 22B to absorb any light that passes through the outer cell 24 of the upper cellular unit 22B (i.e., the outer cell 24 of the upper cellular unit 22B is light permeable in FIG. 2B). More specifically, the second light absorbing element 70B is connected to the bottom wall 36 and is positioned in the gap 59 and extends laterally across the entire width of the gap 59. The second light absorbing element 70B has approximately the same height as each line of adhesive 66 and thus is recessed as compared to the bottom wall 57 of the inner cell 26. In an alternative example, as shown in FIG. 2C, the second light absorbing element 70B may be embedded in the cell material and be coextensive in height with the bottom wall 36 of the outer cell 24. Referring back to FIG. 2B, the width of the second light absorbing element 70B is greater than its height. In one implementation, the second light absorbing element 70B may have an aspect ratio of at least 5:1. A vertical cross-section of the interface 48, moving up along a vertical plane bisecting the cellular units 22A, 22B, includes the top wall 50 of the inner cell 26 of the lower cellular unit 22A, the first light absorbing element 70A, a space 63, a bottom wall 36 of the outer cell 24 of the upper cellular unit 22B, and the second light absorbing element 70B.

As shown in FIG. 2B, the second light absorbing element 70B is centrally located on the bottom wall 36 of the outer cell 24, laterally equidistant between the lines of adhesive 62, 64, and 66. In this location, the second light absorbing element 70B absorbs light that is refracted or directed upward from the various features associated with the interface region 48, including the lines of adhesive 62, 64, 66, the outer cells 24, and the inner cells 26 (in configurations where the outer cell 24 of the lower and/or upper cellular units 22A, 22B is light permeable). In FIG. 2B, the second light absorbing element 70B is laterally aligned with, but vertically separated from, the first light absorbing element 70A.

In operation, light approaching the interface region 48 between the adjacent cellular units 22A, 22B generally encounters the outer cells 24 of the cellular units 22A, 22B, the adhesive 64, or both. If the outer cells 24 are light impermeable, the outer cells 24 reflect the light rays, some of which may encounter the adhesive 64. If the outer cells 24 are light permeable, some of the light rays pass through the outer cells 24 and may initially encounter at least one of the interface 48 components, which include the lines of adhesive 62, 64, 66, portions of the outer cells 24, portions of the inner cells 26, and the light absorbing element(s) 70.

In FIG. 2B, the light absorbing elements 70A, 70B are positioned interior of the adhesive lines 62, 64, 66 and thus the incoming light rays must pass through at least one of the adhesive lines 62, 64, 66 or the outer cell 24 before reaching the light absorbing elements 70A, 70B. Each adhesive line 62, 64, 66 and the outer cell 24, if light permeable, generally absorb and/or reflect a portion of the incoming light rays. Thus, these absorbed or reflected light rays are not transmitted through the interface 48 to the other side of the cellular panel 16. In other words, only a portion of the light approaching the interface 48 from one side of the panel is transmitted to an interior space 63 of the interface 48.

The lines of adhesive 62, 64, 66 and the outer cell 24 generally do not include polished, mirrored, or specular surfaces, but rather have many uneven surfaces or small exterior facets, some of which may be microscopic. Thus, the light rays passing through the adhesive 62, 64, 66 or the outer cell 24 generally exit the surface in a diffuse pattern. Most, if not all, of the diffused light rays encounter and are absorbed by the light absorbing elements 70A, 70B, which are selectively positioned at a bottom and a top of the interface 48, respectively. A small percentage of the light rays may pass laterally by the light absorbing elements 70A, 70B. However, these light rays must pass through at least one additional line of adhesive 62, 64, 66 or outer cell 24 before exiting the interface 48 on the other side of the panel 16. Similar to the previous discussion, the additional lines of adhesive 62, 64, 66 and outer cell 24 absorb and reflect a portion of these light rays. Thus, any amount of light passing through the additional lines of adhesive 62, 64, 66 or outer cell 24 toward the other side of the panel 16 generally is miniscule and unnoticeable. In other words, the configuration of the lines of adhesive 62, 64, 66, the outer cell 24, the light absorbing elements 70A, 70B, or a combination thereof substantially eliminate or significantly reduce any amount of light passing through the interface 48. Generally, no human perceptible amount of light is transmitted through the interface 48 from a first side, which may be a rear or road side, to a second side, which may be a front or room side, of the panel 16, as most if not all of the light passing into an interior space 63 of the interface 48 is absorbed by the light absorbing element(s) 70.

As should be appreciated, although the light absorbing elements 70A, 70B are shown as being a separate component attached to a cellular unit 22A, 22B, the light absorbing elements 70A, 70B may be integral with a wall of a cellular unit 22A, 22B. For example, as previously described, the light absorbing elements 70A, 70B may be a dye that is applied to a portion of the material of a cellular unit 22A, 22B associated with the interface 48. Additionally, it should be appreciated, although two light absorbing elements 70A, 70B are shown, other numbers of light absorbing elements may be used. Examples include only one light absorbing element or more than two light absorbing elements per interface 48.

Referring now to FIG. 3, another example interface 48 between adjacent cellular panels 22A, 22B is provided. Generally, in this example, the lines of adhesive 62, 64, 66 are positioned in approximately the same location as in the example depicted in FIG. 2B. However, the aspect ratio of the laterally outward lines of adhesive 64 is altered. More specifically, the aspect ratio of the lines of adhesive 64 in FIG. 3 is approximately 3:1, whereas the aspect ratio of the lines of adhesive 64 in FIG. 2B is approximately 1:1. In some examples, the aspect ratio of the lines of adhesive is between approximately 1:1 and approximately 10:1. In some examples, the aspect ratio of the lines of adhesive is between approximately 1:1 and approximately 5:1 (width-to-height ratio). In some examples, the aspect ratio of the lines of adhesive is approximately 2:1.

Similar to the example depicted in FIG. 2B, in FIG. 3 multiple light absorbing elements 70A, 70B are positioned at the interface 48 between adjacent cellular units 22A, 22B. A first light absorbing element 70A is centrally located on the top wall 50 of the inner cell 26 of the lower cellular unit 22A and is positioned beneath two adhesive lines 62, which connect the top wall 50 of the inner cell 26 to the top wall 42 of the outer cell 24. The adhesive lines 62 are laterally separated from each other by a gap 29, and the light absorbing element 70A extends continuously beneath the entire width of each adhesive line 62 and across the gap 29. In other words, the width of the first light absorbing element 70A is the aggregate of the width of the two adhesive lines 62 and the width of the gap 29.

Still referring to FIG. 3, a second light absorbing element 70B is associated with the upper cellular unit 22B. In particular, the second light absorbing element 70B is positioned adjacent to an edge 46 of the bottom wall 57, beneath the bottom wall 57, and above an adhesive line 66, which connects the bottom walls 57, 36 together. In other words, the second light absorbing element 70B is positioned vertically between the bottom wall 57 of the upper cellular unit 22B and an adhesive line 66.

The second light absorbing element 70B of FIG. 3 is laterally offset from the center of the bottom wall 36 of the outer cell 24 toward one side of the panel 16, which may be a rear or road side of the panel 16. The second light absorbing element 70B extends continuously across the entire width of the adhesive line 66. In other words, the width of the second light absorbing element 70B is approximately identical to the width of one of the lines of adhesive 66.

In the configuration depicted in FIG. 3, the first light absorbing element 70A is positioned below the interior space 63 of the interface 48, and the second light absorbing element 70B is positioned above the interior space 63 of the interface 48. The first light absorbing element 70A in FIG. 3 has a larger width than the light absorbing element 70A in FIG. 2B and thus may absorb more light due at least in part to the increased surface area. The second light absorbing element 70B in FIG. 3 is laterally offset from the center of the interface 48 toward one side of the panel 16, so as to absorb light transmitted from that side of the panel 16 before or after the light crosses a midpoint of the interface 48. In addition, positioning the second light absorbing element 70B adjacent to a longitudinal edge 46 uncovers the gap 59 located laterally between the opposing edges 46. In configurations where the outer cell 24 is light permeable and the inner cell 26 is light impermeable, the gap 59 acts as a further light prevention feature of the interface 48, as light that passes through the gap 59 enters the interior cavity of the inner cell 26, where the light is absorbed or continuously reflected within the cavity, thereby substantially preventing the light from escaping the interior cavity of the inner cell 26.

Figure 4A:
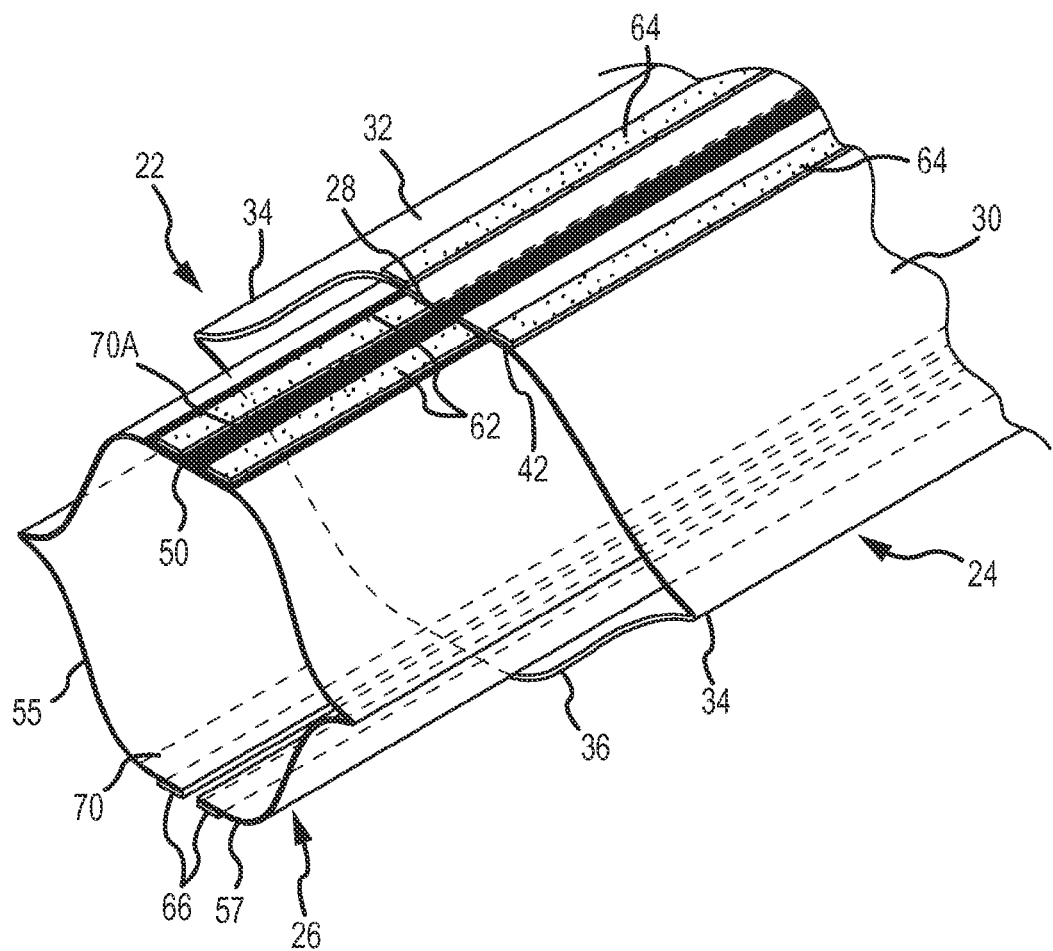
FIG. 4A is an exploded isometric view illustrating an example of a cellular unit.
Figure 4B:
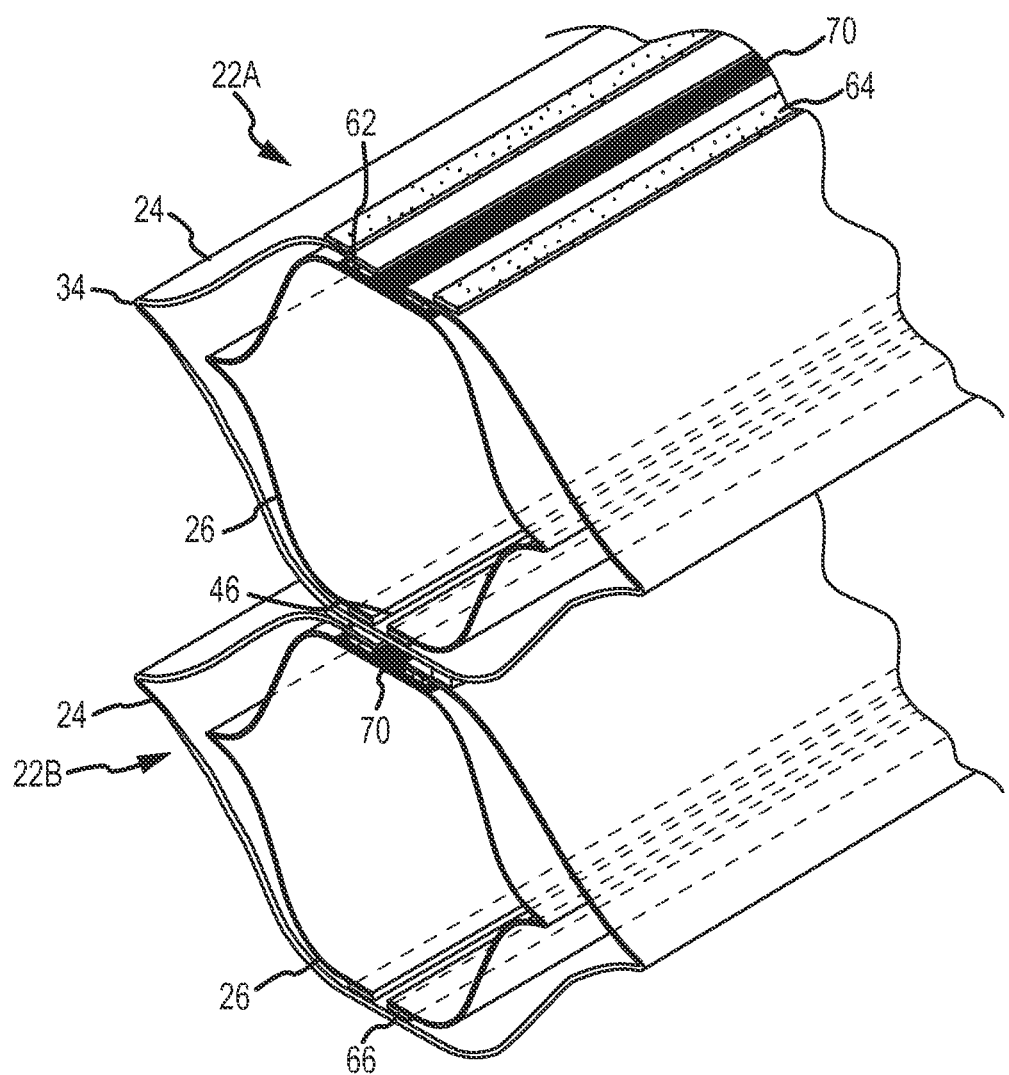
FIG. 4B is an enlarged isometric view of a cellular unit operably connected to a second cellular unit.

As further shown in FIGS. 4A-4B, the light absorbing element 70 may be positioned adjacent to or underneath the adhesive lines 62, 64, 66. This may help prevent light from being transmitted through or around the adhesive 62, 64, 66 since the light may enter the adhesive lines 62, 64, 66 but may be absorbed by the light absorbing element 70. In FIGS. 4A-4B, the first light absorbing element 70A extends beneath spatially separated adhesive lines 62 similar to FIG. 3. However, in contrast to FIG. 3, the first light absorbing element 70A shown in FIGS. 4A-4B extends laterally outward from beneath the adhesive lines 62 toward each side of the panel to absorb or collect light before the light encounters the adhesive lines 62. The first light absorbing element 70A in FIGS. 4A-4B covers a substantial width of the top wall 50 of the inner cell 26. For example, the first light absorbing element 70A covers greater than 50% of the width of the top wall 50. Also depicted in FIG. 4A, the second light absorbing element 70B may be positioned beneath the adhesive line 66 and extend laterally outward to the transition of the bottom wall 57 into the lower sidewall 55 of the inner cell 26. In other words, the second light absorbing element 70B has a width that extends along a bottom wall 57 of the inner cell 26 between a longitudinal edge 46 and the lower sidewall 55 transition point.

While FIGS. 2B, 3, 4A, and 4B show several examples of where a light absorbing element 70 may be located, many other locations may also be effective in substantially preventing light transmission through an interface 48 of adjacent cellular units 22A, 22B. Referring to FIGS. 5-5C, in some implementations, the light absorbing element 70 may be positioned at locations adjacent or otherwise near the interface or seam between the cells 24, 26 as well as at the interface between cellular units 22.

In one example and as shown in FIGS. 5A-5B, a first light absorbing element 70A may be positioned on a top surface 51 of the top wall 50 of the inner cell 26, and a second element 70B may be positioned along a bottom longitudinal edge 46 of the inner cell 26 (see FIG. 5B). Thus, the inner cell 26 may include two separate light absorbing elements 70A, 70B with each light absorbing element 70A, 70B positioned at a different connection location between either the outer cell 24 and inner cell 26 and/or the first cellular unit 22A and the second cellular unit 22B. As further illustrated in FIG. 5, the first light absorbing element 70A is centrally located on a top wall 50 of the inner cell 26 and extends laterally outward across the gap 29, underneath both of the spatially separated adhesive lines 62, and laterally outward from an outer edge of each of the adhesive lines 62. The first light absorbing element 70A has a width that is a substantial portion of the entire width of the top wall 50. The width of the first light absorbing element 70A may be at least 50% of the entire width of the top wall 50. Also illustrated in FIG. 5, the second light absorbing element 70B is positioned beneath the adhesive line 66 and extends from a longitudinal edge 46 of the bottom wall 57 across the entire width of the adhesive line 66 and laterally outward from an outer edge of the adhesive line 66.

FIG. 5C illustrates an isometric view of the inner cell 26 with the longitudinal edges 46 spaced directly next to one another (without a gap therebetween). The inner cell 26 of FIG. 5C includes a first light absorbing element 70A positioned on a top wall 50 and a second light absorbing element 70B positioned on a bottom wall 57. As illustrated, the first light absorbing element 70A is positioned centrally on the top wall 50 approximately equidistant from the sides of the inner cell 26. The first light absorbing element 70A in FIG. 5C has a width that is approximately one-third of the entire width of the top wall 50. The second light absorbing element 70B is positioned on the bottom wall 57 and is laterally offset from the first light absorbing element 70A. While FIGS. 5-5C only show a single cell, there may be another cell, as well as adjacent top and bottom cellular units that work with the light absorbing elements 70A, 70B to absorb light between the cellular units and cells.

Figure 6:
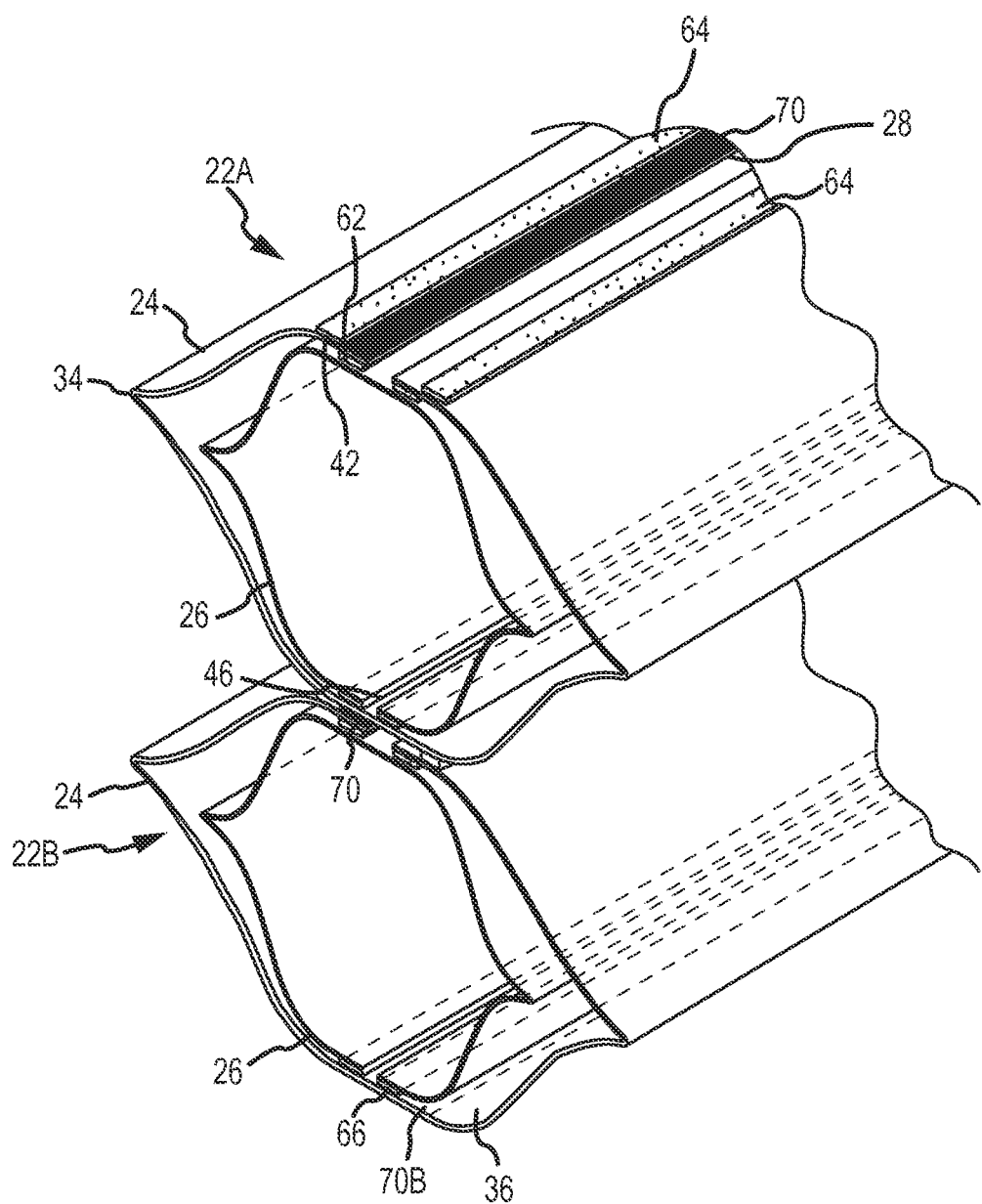
FIG. 6 is an enlarged isometric view of another example of a cellular unit operably connected to a second cellular unit.

As previously described, in some implementations the light absorbing element 70 may be positioned on the outer cell 24. FIG. 6 is an isometric view of the first cellular unit 22A and the second cellular unit 22B operably connected together. The light absorbing element 70 may be operably connected to an outer surface of the outer cell 24 near one or both of the edges 28. Alternatively or additionally, in some instances, the light absorbing element 70 may be positioned on an outer surface of the bottom wall 36 of the outer cell 24 (as shown in the cellular unit 22B in FIG. 6B). Thus, the light absorbing element 70 may be positioned at a seam or interface location between cellular units 22. As illustrated in FIG. 6, the light absorbing element 70 extends laterally from a longitudinal edge 28 of the top wall 42 of the outer cell 24 to an inner edge of an adhesive line 64. The light absorbing element 70 may extend beneath the adhesive line 64 and laterally outward from an outer edge of the adhesive line 64 in some examples.

The light absorbing element 70 may have varying widths that may depend on the particular configuration of the cells 24, 26 and/or cellular unit 22, as well as the width, thickness, and placement of the adhesive. For example, if the connection interface between the cellular units 22A, 22B has a larger amount of adhesive or additional seams, a wider light absorbing element 70 may be necessary in order to absorb appropriate amounts of light. Additionally, in some examples it may be desirable for the light absorbing element 70 to have a smaller width so that it may not be visible from a normal viewing angle by a user. This may be especially desirable in instances where the outer cell 24 may be formed of a lighter colored material such that the color of the light absorbing element 70 may be visible through the outer cell 24. The light absorbing element 70 may extend only underneath the adhesive or may extend laterally from beneath either or both sides of the adhesive.

In some implementations the light absorbing element 70 may be incorporated into or onto material used to create the inner cell 26 and/or the outer cell 24. For example, FIGS. 7-10 illustrate plan views of an unformed inner cell 26 including the light absorbing element 70. As described above, the inner cell 26 may be a light-blocking or light-reducing material, such as Mylar, polyurethane, and polyolefins, and the light absorbing elements 70A, 70B may be blackened or dyed portions of the inner cell 26 material.

Figure 7:
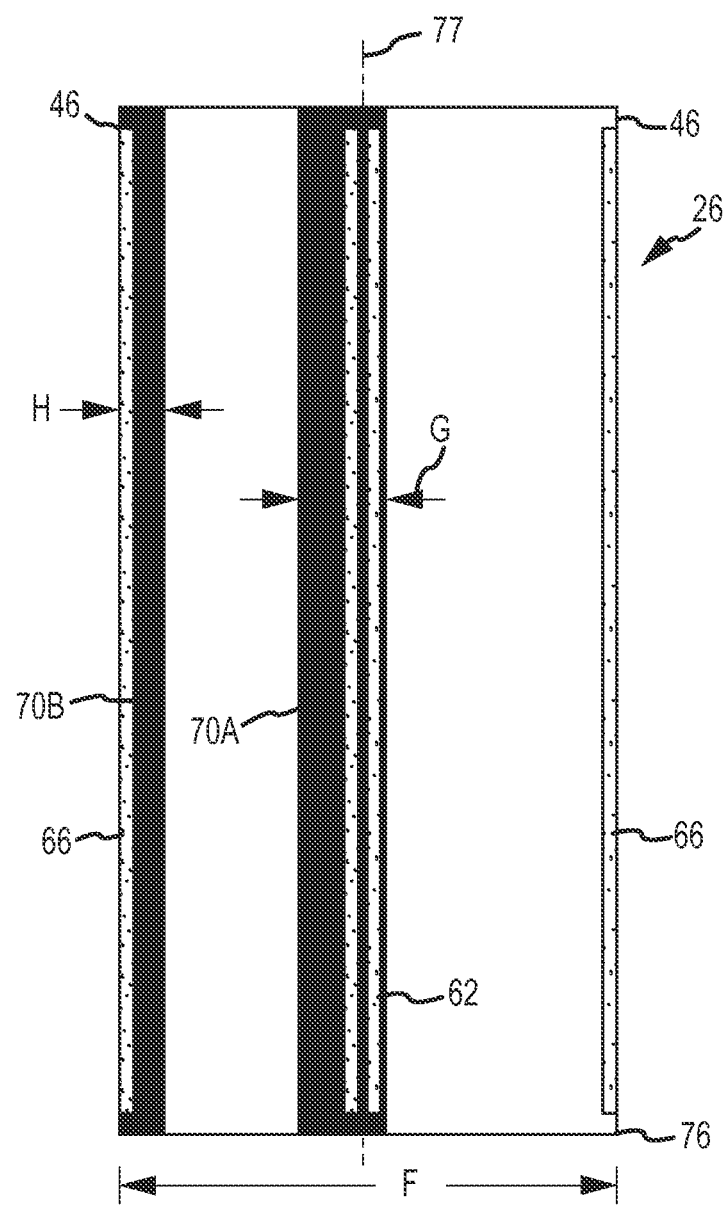
FIG. 7 is a top plan view of an example unformed inner cell including two light absorbing elements.

FIG. 7 is a first example illustrating two separate light absorbing elements 70A and 70B positioned on the unformed inner cell 26. As noted above, the cells 24, 26 are made from long and narrow strips of material folded, bent or creased along longitudinal lines. The strip of material 76 may have a total width F and the light absorbing elements 70A, 70B may have widths G, H that are smaller than the width F of the material 76. As briefly described above, the strip of material 76 may have a first color and the light absorbing element 70 may be a black dyed portion of the material 76.

The first light absorbing element 70A may be positioned near a middle or centerline 77 of the strip of material 76, such that when the inner cell 26 is formed the first light absorbing element 70A may be positioned on an outer surface of the continuous top wall 50 of the inner cell 26 (see FIG. 5). The first light absorbing element 70A may be slightly off-center from the centerline 77 of the material 76. For example, as shown in FIG. 7, the first light absorbing element 70A may terminate at a centerline 77 of the width F of the material 76. The adhesive lines 62 for operably connecting the inner cell 26 to the outer cell 24 may be positioned on top of the light absorbing element 70, such that the light absorbing element 70 may extend past either side of the adhesive lines 62. In other examples, the adhesive lines 62 may be positioned off-center and adjacent to the light absorbing element 70.

The second light absorbing element 70B may be positioned adjacent one of the longitudinal edges 46 of the inner cell 26. For example, referring to FIGS. 5, 7, and 8A, the second light absorbing element 70B may be positioned on a bottom surface 53 of the inner cell 26 at or adjacent to the longitudinal edge 46. As with the first light absorbing element 70A, the adhesive lines 66 may positioned on top of or adjacent to the second light absorbing element 70B.

The second light absorbing element 70B may be especially useful for absorbing light that may enter through the material of the outer cell 24. As described above, in some implementations the outer cell 24 may be a light-transmitting material. In this implementation, the second light absorbing element 70B may be at least partially covered from the interface 48 between cellular units 22A, 22B (see FIGS. 3 and 5), and still function to absorb light that could potentially otherwise be transmitted from one side of the panel 16 to the other. This is because light could enter through the outer cell 24 and without the light absorbing element 70B would be able to be transmitted through the top 30 of the outer cell 24 and through the interface 48. But, with the second light absorbing element 70B, the light is absorbed prior to being transmitted through the interface 48.

A third light absorbing element 70C may be positioned adjacent another of the longitudinal edges 46 of the inner cell 26. For example, referring to both FIGS. 7A and 9A, the third light absorbing element 70C may be positioned on a bottom surface 53 of the inner cell 26 at or adjacent to the longitudinal edge 46. As with the first and second light absorbing elements 70A, 70B, the adhesive lines 66 may positioned on top of or adjacent to the third light absorbing element 70C.

Figure 7A:
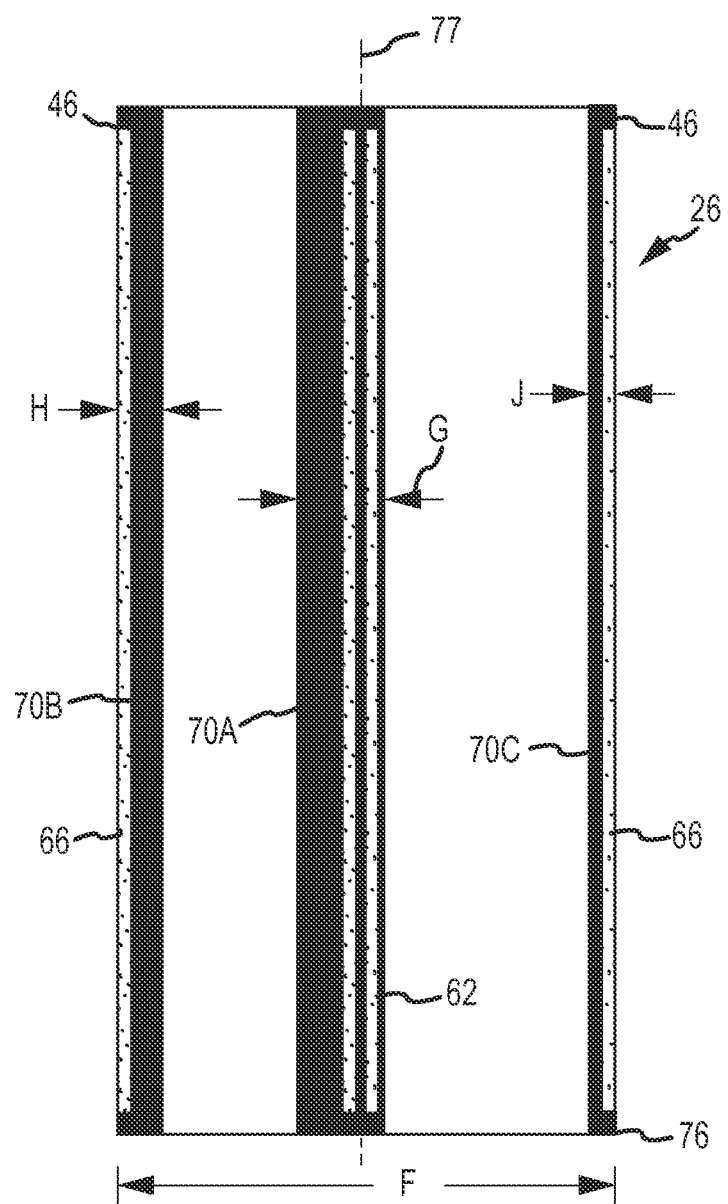
FIG. 7A is a top plan view of the unformed inner cell of FIG. 7 with a third light absorbing element.

A width of the first light absorbing element 70A, the second light absorbing element 70B, and the third light absorbing element 70C may be varied. For example, FIGS. 7-7A illustrates the first light absorbing element 70A as having a width G, the second light absorbing element as having a width H, and the third light absorbing element as having a width J. In this example, depending on the width of the material F, the width G of the first light absorbing element may be approximately ½ inch, the width H of the second light absorbing element 70B may be approximately 9/32 of an inch, and the width J of the third light absorbing element 70C may be approximately 5/32 of an inch. Although different dimensions are possible, in some instances, the width of the first light absorbing element 70A may be approximately $1/6^{th}$ the width F of the material 76. In this example, the widths G, H, J of the light absorbing elements 70A, 70B, 70C may be thinner so that the user may be substantially prevented from seeing the light absorbing elements 70A, 70B from normal viewing angles.

Figure 8:
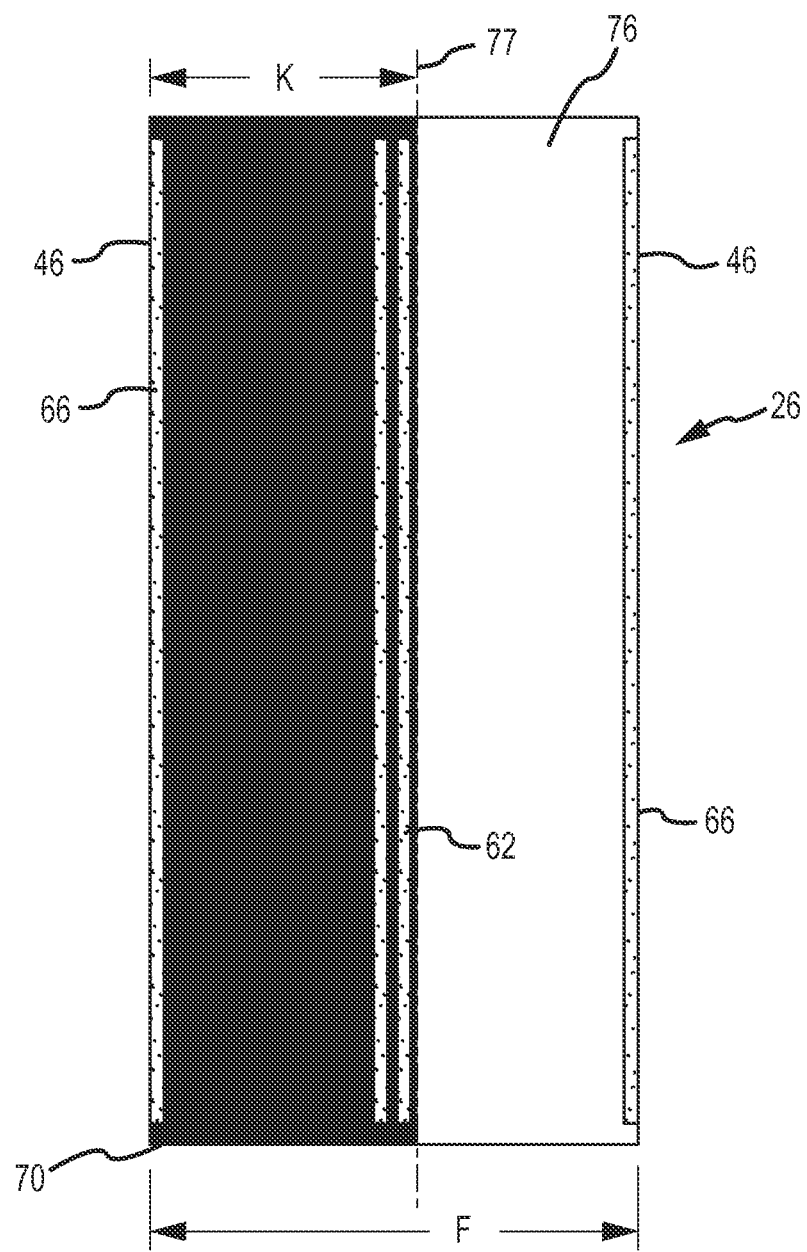
FIG. 8 is a top plan view of an example unformed inner cell including one light absorbing element.
Figure 8A:
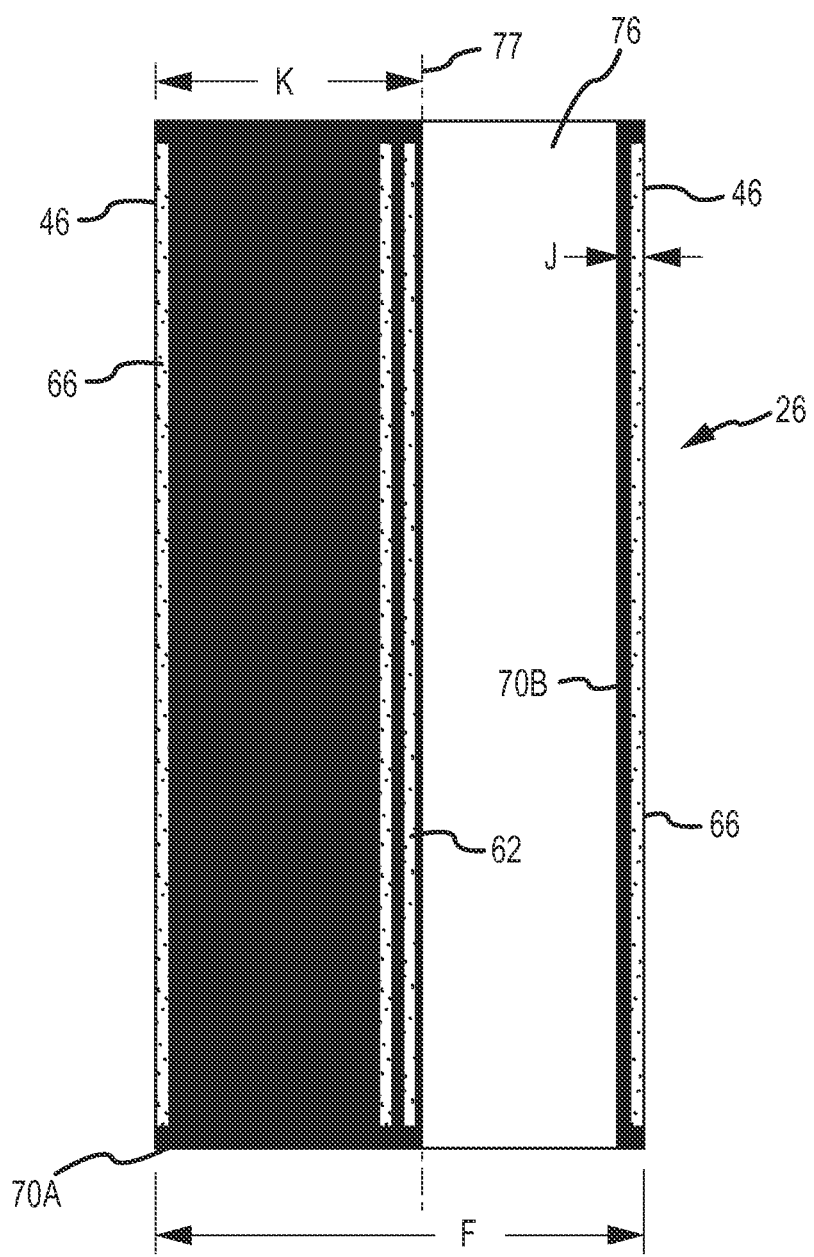
FIG. 8A is a top plan view of the unformed inner cell of FIG. 8 with a second light absorbing element.

FIGS. 8-8A are another example of a strip of material 76 used to form the inner cell 26 or outer cell 24. As shown in the example of FIG. 8, there may be a single light absorbing element 70 with a width K that may be approximately half of the width F of the material 76. In this manner, half of the outer surface of the inner cell 26 may include the light absorbing element 70A. Similarly, although not shown in FIG. 8, in some instances, the light absorbing element 70 may be positioned on the entire outer surface of the inner cell 26. In other words, the entire outer surface of the inner cell 26 may be dyed black. As shown in FIG. 8A, a second light absorbing element 70B with a width J may be positioned adjacent to a longitudinal edge 46. In this example, more than half of the outer surface of the inner cell 26 is associated with a light absorbing element 70.

Figure 9:
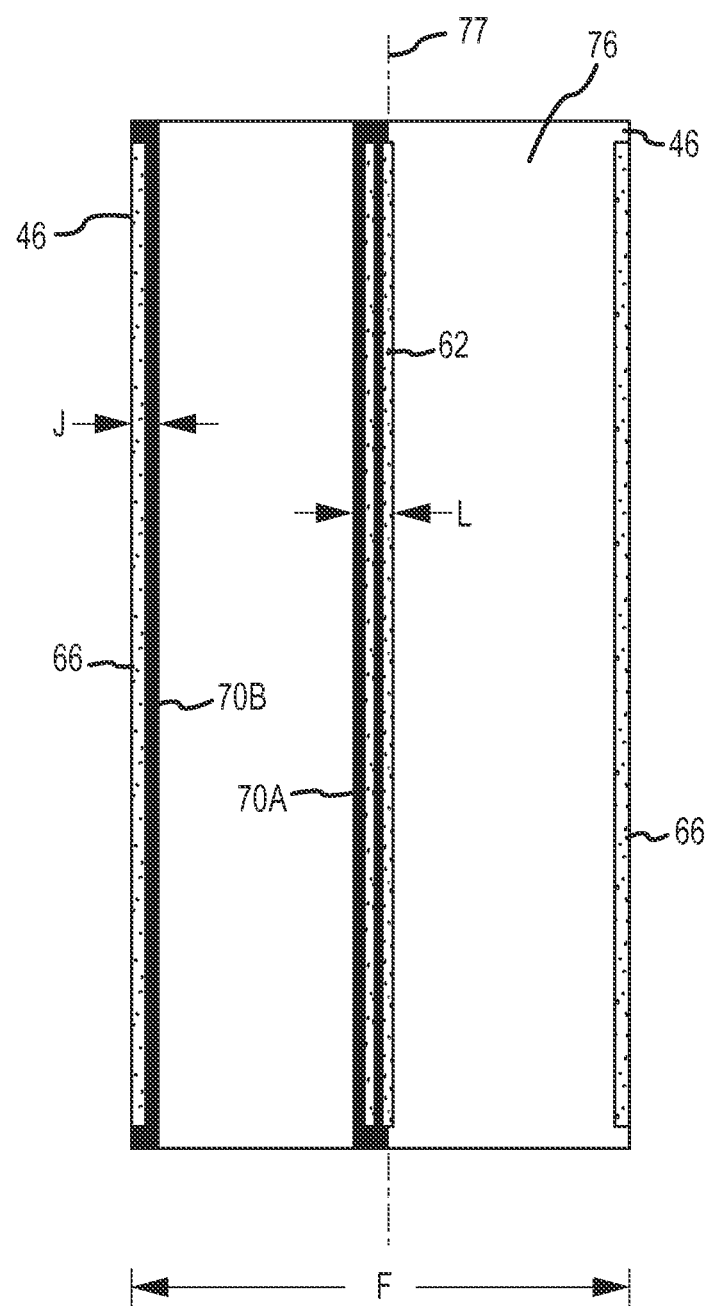
FIG. 9 is a top plan view of an example unformed inner cell including two light absorbing elements that are smaller in width than the light absorbing elements shown in FIG. 7.
Figure 9A:
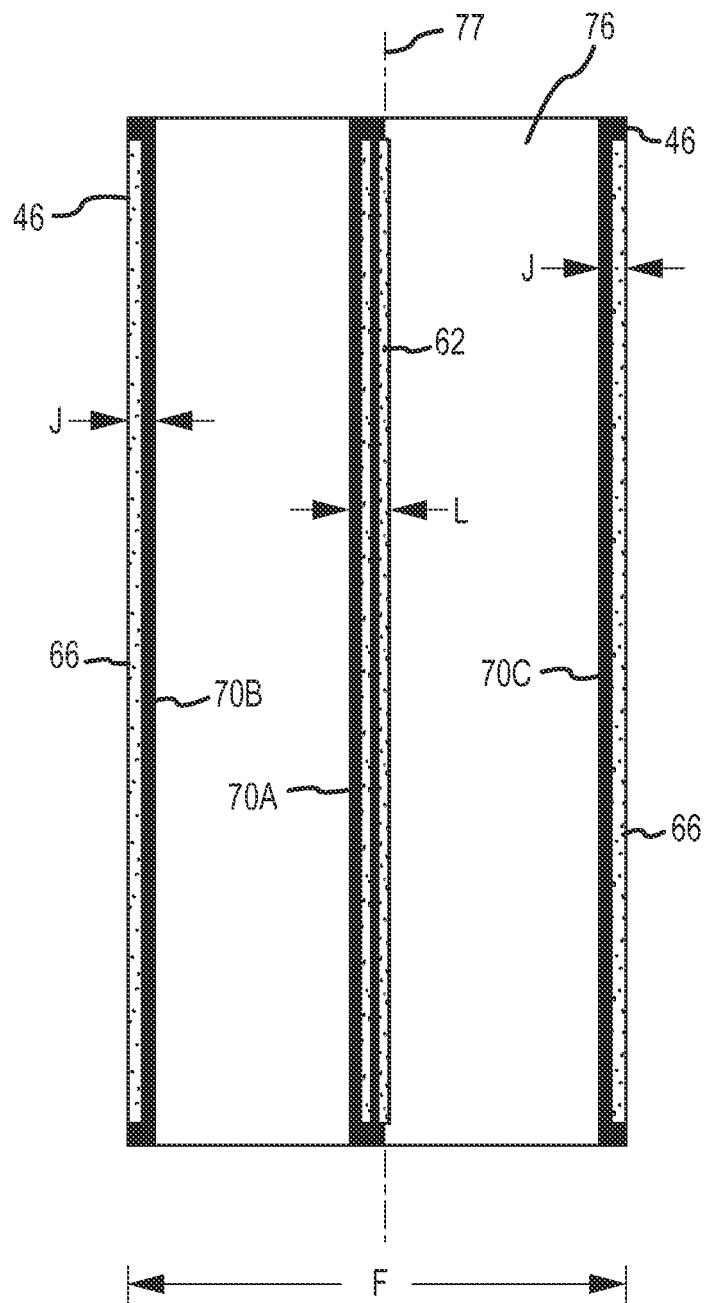
FIG. 9A is a top plan view of the unformed inner cell of FIG. 9 with a third light absorbing element.

FIG. 9 is another example of the light absorbing elements 70A, 70B. In this example, the widths of the light absorbing elements 70A, 70B may be substantially reduced. This may allow the outer cell material 24 to be a lighter color since the color of the light absorbing elements 70A, 70B may be dark, the larger widths may be visible through the outer cell 24. With a narrower width, the elements 70A and 70B are less likely to be seen through a lighter material. In one example, the width F of the material may be approximately 3 inches. The first light absorbing element 70A may have a width L that may be approximately $3/16^{th}$ of an inch and the second light absorbing element 70B may have a width J that may be approximately $5/32^{nd}$ of an inch. However, other dimensions are also applicable, depending on the width of the material 76 and/or desired widths of the light absorbing elements 70A, 70B. In this example, the light absorbing elements 70A, 70B may be substantially reduced in width, but may still be able to substantially prevent light from being transmitted from one side of the cellular panel 16 to a second side of the cellular panel 16. FIG. 9A includes a third light absorbing element 70C having the same width J as the second light absorbing element 70B. As depicted, the second and third light absorbing elements 70B, 70C are symmetrical about the centerline 77. Although not depicted in FIG. 9A, the first light absorbing element 70A may be centered along the centerline 77 so that the centerline delineates the strip of material 76 into two equal longitudinal halves or parts.

CONCLUSION

The foregoing description has broad application. For example, while examples disclosed herein may focus on the position or width of the light absorbing element, it should be appreciated that the concepts disclosed herein may equally apply to generally any position or width of the light absorbing element. Similarly, although the light absorbing element has been discussed with respect to being a separate element, the devices and techniques are equally applicable to embodiments where the inner cell or the outer cell is formed integrally with the light absorbing element. For instance, the light absorbing material may be embedded in the strip of material forming the cell (at the desired positional location), or may be encompassed throughout the thickness (at the right positional location) of the strip of material forming the cell. Additionally, the light absorbing element may be formed of a separate piece of sheet material, such as a woven or non-woven fabric made of natural or man-made material. The light absorbing element of this type may be positioned and/or secured in desired locations by sewing, adhesive, fasteners, or other types of securement. Accordingly, the discussion of any embodiment is meant only to be explanatory and is not intended to suggest that the scope of the disclosure, including the claims, is limited to these examples. Also, while the materials used to form the cells in the examples described herein are generally flexible material, it is contemplated that they maybe be rigid or semi-rigid, or a combination, and made of man-made or natural or a combination of materials.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary.

What is claimed is:

1. A covering for an architectural opening comprising:
   at least two cellular units coupled together at an attachment interface extending in a lengthwise direction of the at least two cellular units; and
   a non-adhesive first light absorbing element positioned at the attachment interface of the at least two cellular units such that the first light absorbing element extends in the lengthwise direction to absorb light passing between the at least two cellular units to reduce light leakage between adjacent cells, the first light absorbing element selected from the group consisting of a dye, an ink, a layer of plastic, and one or more strips of material; and
   wherein the cellular units are operable to move in a direction, different from the lengthwise direction, as the covering moves between an extended position and a retracted position.

2. The covering of claim 1, wherein each of the at least two cellular units includes:
   an outer cell; and
   an inner cell at least partially received within the outer cell.

3. The covering of claim 2, wherein the first light absorbing element is positioned on the inner cell.

4. The covering of claim 2, wherein the first light absorbing element is positioned on an outer surface of the inner cell exposed at the interface.

5. The covering of claim 2, wherein the first light absorbing element is positioned on the outer cell.

6. The covering of claim 1, further comprising a second light absorbing element positioned on an opposite side of the cellular unit from the first light absorbing element.

7. The covering of claim 1, wherein the first light absorbing element absorbs substantially all visible light wavelengths incident on the first light absorbing element.

8. The covering of claim 1, wherein the first light absorbing element is at least partially embedded within a portion of at least one of the at least two cellular units.

9. The covering of claim 1, wherein the first light absorbing element is integral with a portion of at least one of the at least two cellular units.

10. A cellular panel for covering an architectural opening comprising:
    a first cellular row extending in a lengthwise direction;
    a second cellular row operably connected to the first cellular row at an interface extending in the lengthwise direction between the first and second cellular rows; and
    a non-adhesive first light absorbing element positioned at the interface between the first cellular row and the second cellular row;
    wherein the cellular rows are operable to move in a direction, different from the lengthwise direction, as the cellular panel moves between an extended position and a retracted position.

11. The cellular panel of claim 10, wherein
    the first cellular row includes
       a first outer cell; and
       a first inner cell at least partially received within the first outer cell;
    the second cellular row includes
       a second outer cell; and
       a second inner cell at least partially received within the second outer cell.

12. The cellular panel of claim 11, wherein the first light absorbing element is positioned on an outer surface of the second inner cell.

13. The cellular panel of claim 11, wherein the first outer cell defines a gap through which the first light absorbing element is exposed.

14. The cellular panel of claim 11, wherein the first light absorbing element is positioned adjacent a first longitudinal edge of the first inner cell.

15. The cellular panel of claim 11, wherein a vertical cross-section of the interface comprises:
    a top wall of the second inner cell,
    the first light absorbing element positioned above the top wall, and
    a bottom wall of the first outer cell positioned above the first light absorbing element.

16. The cellular panel of claim 15, wherein the covering further comprises a second light absorbing element, and wherein the vertical cross-section of the interface further comprises the second light absorbing element positioned above the bottom wall.

17. The covering of claim 10, wherein the first light absorbing element is separate from an attachment element connecting the first and second cellular rows together.

18. The covering of claim 17, wherein the attachment element comprises an adhesive.

19. The covering of claim 10, wherein the first light absorbing element is an ink or a dye.

20. A covering for an architectural opening comprising:
a head rail extending in a horizontal direction between a first end and an opposed second end;
a cellular panel operably connected to the head rail and including at least two cellular units coupled together at an attachment interface extending in the horizontal direction between the at least two cellular units, each cellular unit comprising:
an outer cell; and
an inner cell at least partially received within the outer cell;
a non-adhesive first light absorbing element positioned at the attachment interface such that the first light absorbing element extends between the at least two cellular units in the horizontal direction; and
a bottom rail operably connected to an opposite end of the cellular panel from the head rail and movable vertically as the covering moves between an extended position and a retracted position.

21. The covering of claim 20, wherein the first light absorbing element is embedded in at least one of the inner cell or the outer cell and absorbs substantially every visible light wavelength incident on the first light absorbing element.

22. The covering of claim 20, wherein at least a portion of an outer surface of the inner cell is exposed at the interface such that the outer cell of another cellular unit is positioned adjacent the inner cell.

23. The covering of claim 20, wherein the first light absorbing element is positioned on the inner cell.

* * * * *